(12) United States Patent
Sieradzki et al.

(10) Patent No.: US 12,715,193 B2
(45) Date of Patent: Aug. 25, 2026

(54) METHODS OF PRODUCING LAMINATES OF CROSSLINKED POLYOLEFIN FOAM WITH POLYOLEFIN TEXTILES

(71) Applicant: Toray Plastics (America), Inc., North Kingstown, RI (US)

(72) Inventors: Paul Sieradzki, Winchester, VA (US); Tyler Austin Bowman, Stephenson, VA (US)

(73) Assignee: Toray Plastics (America), Inc., North Kingstown, RI (US)

( * ) Notice: Subject to any disclaimer, the term of this patent is extended or adjusted under 35 U.S.C. 154(b) by 160 days.

(21) Appl. No.: 18/618,581

(22) Filed: Mar. 27, 2024

(65) Prior Publication Data

US 2025/0303667 A1 Oct. 2, 2025

(51) Int. Cl.
*B32B 5/20* (2006.01)
*B29C 48/00* (2019.01)
(Continued)

(52) U.S. Cl.
CPC ............ *B32B 5/20* (2013.01); *B29C 48/0012* (2019.02); *B32B 5/245* (2013.01); *B32B 37/06* (2013.01);
(Continued)

(58) Field of Classification Search
CPC ........... B32B 5/20; B32B 5/245; B32B 5/022; B32B 5/024; B32B 5/026; B32B 5/18; B32B 2038/0084; B32B 2038/0076; B32B 37/15; B32B 37/156; B32B 37/06; B32B 37/10; B32B 37/203; B32B 38/0036; B32B 2262/0253; B32B 2262/148; B32B 2262/152; B32B 2262/062; B32B 2266/025; B32B 2309/04; B32B 2310/0418; B32B 2310/0887; B32B 2250/02; B32B 2250/03; B32B 2305/022; B32B 2307/7145; B32B 2437/02;
(Continued)

(56) References Cited

U.S. PATENT DOCUMENTS 4,303,456 A * 12/1981 Schmuck .............. D06M 17/06 427/244
5,656,675 A * 8/1997 Kobayashi .............. C08L 53/00 521/143
(Continued)

FOREIGN PATENT DOCUMENTS

CN 106317631 A 1/2017
CN 106046483 B 6/2020
(Continued)

OTHER PUBLICATIONS

Machine translation of JP H0570621 date uknown.*
(Continued)

*Primary Examiner* — John L Goff, II
(74) *Attorney, Agent, or Firm* — Morrison & Foerster LLP

(57) ABSTRACT

Described herein are methods of preparing continuous polyolefin textiles laminated to a physically crosslinked, closed cell continuous foam sheet. The methods can include extruding a foamable sheet through a nip while simultaneously feeding a polyolefin textile into the nip to laminate the textile to the foamable sheet, irradiating the laminate, and foaming the laminate.

15 Claims, 13 Drawing Sheets

(51) Int. Cl.

| | |
|---|---|
| ***B32B 5/24*** | (2006.01) |
| ***B32B 37/06*** | (2006.01) |
| ***B32B 37/10*** | (2006.01) |
| ***B32B 38/00*** | (2006.01) |
| *B29K 23/00* | (2006.01) |
| *B29K 105/04* | (2006.01) |
| *B29K 105/24* | (2006.01) |

(52) U.S. Cl.

CPC .......... *B32B 37/10* (2013.01); *B32B 38/0036* (2013.01); *B29K 2023/06* (2013.01); *B29K 2023/12* (2013.01); *B29K 2105/04* (2013.01); *B29K 2105/24* (2013.01); *B32B 2038/0076* (2013.01); *B32B 2038/0084* (2013.01); *B32B 2262/0253* (2013.01); *B32B 2262/148* (2021.05); *B32B 2262/152* (2021.05); *B32B 2266/025* (2013.01); *B32B 2309/04* (2013.01); *B32B 2310/0418* (2013.01); *B32B 2310/0887* (2013.01)

(58) Field of Classification Search

CPC ... B32B 2471/04; B32B 9/025; B32B 27/065; B32B 27/12; B32B 27/32; B29C 48/0012; B29K 2023/06; B29K 2023/12; B29K 2105/04; B29K 2105/24

USPC .............. 156/78, 79, 244.11, 244.24, 244.27

See application file for complete search history.

(56) References Cited

U.S. PATENT DOCUMENTS

| | | | | | |
|---|---|---|---|---|---|
| 5,996,195 | A * | 12/1999 | White | D06C 3/065 26/88 | |
| 6,495,087 | B1 | 12/2002 | Hwang | | |
| 8,038,925 | B2 | 10/2011 | Tien | | |
| 10,301,447 | B2 | 5/2019 | Sieradzki et al. | | |
| 2010/0168704 | A1 | 7/2010 | Thomas et al. | | |
| 2013/0210309 | A1 | 8/2013 | Kim et al. | | |
| 2013/0280517 | A1 | 10/2013 | Buehring et al. | | |
| 2016/0185025 | A1* | 6/2016 | Baldwin | B29C 48/18 264/415 | |
| 2017/0198111 | A1* | 7/2017 | Chen | C08J 9/0066 | |
| 2024/0327590 | A1 | 10/2024 | Baldwin | | |

FOREIGN PATENT DOCUMENTS

| | | | | |
|---|---|---|---|---|
| DE | 10204728 | A1 | 8/2003 | |
| EP | 0873865 | A2 * | 10/1998 | B29C 45/14811 |
| EP | 3554809 | A1 | 10/2019 | |
| JP | H0570621 | A * | 3/1993 | |
| JP | 3808380 | B2 | 8/2006 | |
| JP | 3923969 | B2 | 6/2007 | |
| JP | 4573612 | B2 | 11/2010 | |
| JP | 4924592 | B2 | 4/2012 | |
| JP | 5077392 | B2 | 11/2012 | |
| KR | 20-0194216 | Y1 | 9/2000 | |
| KR | 10-0328722 | B1 | 3/2002 | |
| KR | 10-1108874 | B1 | 1/2012 | |
| WO | 2016/109544 | A1 | 7/2016 | |
| WO | 2018/114300 | A1 | 6/2018 | |

OTHER PUBLICATIONS

Machine translation of EP 0873865 date uknown.*

Klempner et al. (2004). “Chemistry and Preparation” Chapter 8 in Handbook of Polymeric Foams and Foam Technology. Hanser Gardner Publications, Inc., 37 pages.

* cited by examiner

METHODS OF PRODUCING LAMINATES OF CROSSLINKED POLYOLEFIN FOAM WITH POLYOLEFIN TEXTILES

FIELD OF THE DISCLOSURE

This disclosure relates generally to crosslinked polyolefin foams laminated with polyolefin textiles. More specifically, this disclosure relates to laminating a polyolefin textile to a foamable sheet prior to foaming the foamable sheet.

BACKGROUND OF THE DISCLOSURE

Crosslinked polyolefin foam sheets are used in numerous applications and produced by a variety of methods. In one method, crosslinked polyolefin foam sheets are obtained by (a) extruding a foamable composition, (b) irradiating the foamable composition with ionizing radiation, and then (c) continuously foaming the composition.

In some applications, it can be desirable to laminate a polyolefin textile to at least one surface of the foam sheet. The laminate can then be used as a component in various commercial products including automobile interior trim, furniture, footwear, walls, storage casing, luggage, and/or coverings, among others.

Laminating a textile to a polyolefin foam sheet is traditionally accomplished on separate equipment specifically designed for laminating rolls of flexible materials such as textiles, foams, films, non-wovens, leathers, etc., to each other. For the three-step method of production where a foam sheet is obtained by (a) extruding a foamable composition, (b) irradiating the foamable composition with ionizing radiation, and (c) continuously foaming the composition, traditional lamination of a textile to the foamed sheet becomes a fourth step (d) in the production method after foaming.

SUMMARY OF THE DISCLOSURE

It has been discovered that it is possible to produce a laminate of polyolefin textile with a physically crosslinked polyolefin closed cell continuous foam sheet by incorporating the laminating step into the extrusion step of the foam production process. Specifically, a polyolefin textile laminated with a polyolefin foam sheet can be produced by extruding a foamable composition through a nip while simultaneously feeding a polyolefin textile into the nip to laminate the textile to the foamable sheet. The extruded unfoamed or foamable laminated sheet can then be irradiated with ionizing radiation and the irradiated laminate can then be foamed. By incorporating the laminating step into the extrusion of the foamable composition, the number of manufacturing steps can be reduced, thereby eliminating the traditional separate lamination operation, simplifying the production of the laminate, and/or reducing costs associated with the manufacturing of the laminate.

In some embodiments, a method of forming a laminate includes extruding a foamable sheet comprising polypropylene and/or polyethylene; feeding the extruded foamable sheet and a textile through a plurality of rollers to bond the textile to a side of the extruded foamable sheet to form a laminate; irradiating the laminate with ionizing radiation; and foaming the foamable sheet of the laminate. In some embodiments, feeding the extruded foamable sheet and the textile through the plurality of rollers comprises applying pressure to a side of the extruded foamable sheet opposite the textile and applying pressure to a side of the textile opposite the extruded foamable sheet. In some embodiments, the plurality of rollers is configured to melt bond the textile to the side of the extruded foamable sheet. In some embodiments, the textile comprises at least one polypropylene and/or at least polyethylene. In some embodiments, the textile further comprises non-olefinic polymer, natural fiber, and/or animal-based fiber. In some embodiments, the textile further comprises an antioxidant, lubricant, processing aid, thermal stabilizer, colorant, flame retardant, antistatic agent, electrostatic dissipative agent, nucleating agent, plasticizer, antimicrobial, fungicide, light stabilizer, UV absorbent, anti-blocking agent, filler, deodorizer, odor adsorber, anti-fogging agents, or combinations thereof. In some embodiments, the textile has a non-olefinic content of at most 30 wt. %. In some embodiments, the textile is a woven or a knit textile. In some embodiments, the foamable sheet comprises a crosslinking promoter. In some embodiments, irradiating the laminate with ionizing radiation occurs at least 5 days after forming the laminate such that at least some of the crosslinking promoter diffuses into the textile. In some embodiments, the foamable sheet comprises a chemical foaming agent. In some embodiments, the ionizing radiation is selected from the group consisting of alpha, beta (electron), x-ray, gamma, and neutron. In some embodiments, the laminate is irradiated up to four separate times. In some embodiments, the ionizing radiation crosslinks the laminate to a crosslinking degree of 15-75%. In some embodiments, foaming comprises heating the irradiated laminate with molten salt and radiant heaters or a hot air oven. In some embodiments, the method includes applying tension to the textile in the machine direction while the textile is fed through the plurality of rollers. In some embodiments, the method includes applying tension to the textile in the cross-machine direction while the textile is fed through the plurality of rollers. In some embodiments, a laminate is produced by the methods disclosed herein.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

It is understood that aspects and embodiments described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

In the disclosure, "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

Additional advantages will be readily apparent to those skilled in the art from the following detailed description. The examples and descriptions herein are to be regarded as illustrative in nature and not restrictive.

DETAILED DESCRIPTION OF EXEMPLARY EMBODIMENTS

Figure 1:
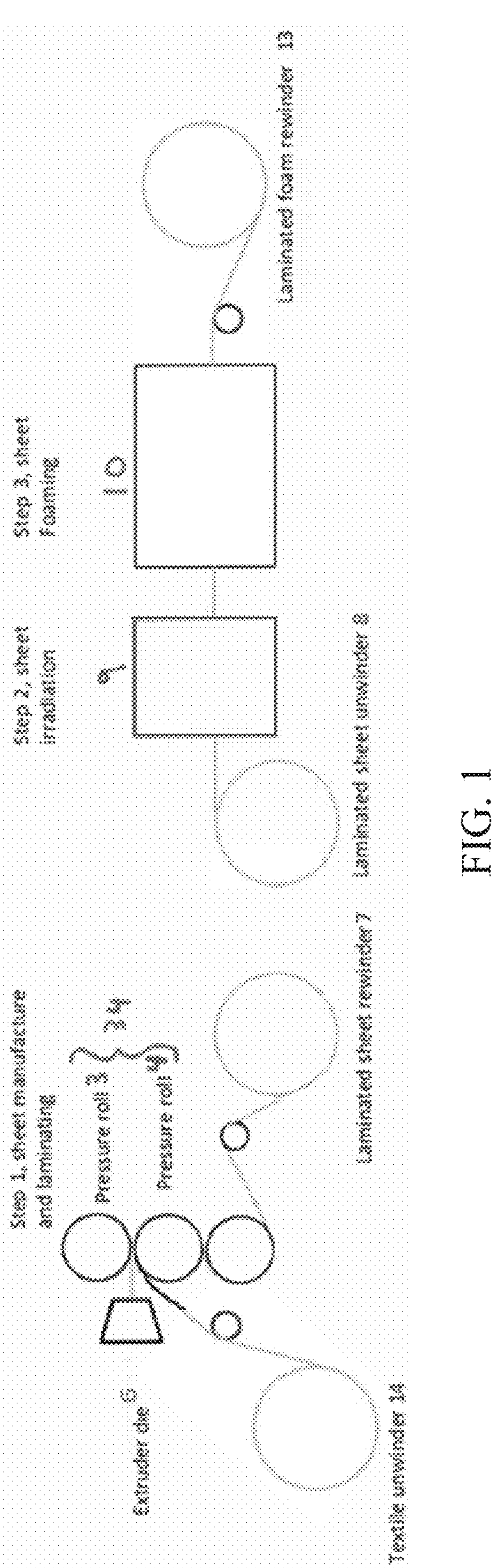
FIG. 1 illustrates an exemplary foam laminating process in accordance with some embodiments disclosed herein.

Described are foam laminates and methods of producing crosslinked, closed cell continuous polyolefin foam laminates by laminating a foamable sheet to a textile during extrusion of the foamable sheet. In some embodiments, the polyolefin laminate can be obtained by (a) extruding a foamable composition through a nip while simultaneously feeding a polyolefin textile into the nip to laminate the textile to the foamable composition, (b) irradiating the laminate with ionizing radiation, and (c) foaming the laminate.

In the extrusion step, raw materials of the foamable composition can be fed into an extruder. The method of feeding ingredients into the extruder can be based on the design of the extruder and the material handling equipment available. Preblending ingredients of the foamable composition may be performed, if necessary or desired, to facilitate their dispersal. If performed, a Henshel mixer may be used for preblending. In some embodiments, all ingredients can be preblended and fed thru a single port in the extruder. In some embodiments, the ingredients can also be individually fed thru separate designated ports for each ingredient or into a single port in the extruder. For example, if an ingredient is a liquid, the liquid can be added through a feeding gate (or gates) on the extruder or through a vent opening on the extruder (if equipped with a vent) instead of being preblended with solid ingredients. Combinations of preblending and individual ingredient port feeding can also be employed. Exemplary extrusion techniques are also disclosed in Chapter 8 of Handbook of Polymeric Foam and Foam Technology (2nd Edition, edited by Daniel Klempner and Vahid Sendijarevic), the subject matter of which is incorporated herein by reference in its entirety.

In some embodiments, the extruder can deliver a steady amount of a foamable composition into a sheeting die to create an unfoamed or foamable sheet. The thickness of the unfoamed sheet can be controlled by the overall die gap. However, the sheet thickness can further be adjusted, for example, by stretching (i.e., "drawing") the melted extrudate and/or flattening the melted extrudate through a laminating nip.

A foamable composition fed into the extruder can include at least one polypropylene and/or at least one polyethylene.

In some embodiments, polypropylene includes, but is not limited to, a broad range of homopolymer polypropylene ("hPP"), polypropylene-ethylene copolymer, polypropylene based thermoplastics polyolefin ("TPO"), and/or polypropylene based thermoplastic polyolefin vulcanizate ("TPV"), any of which can be employed in the foamable composition to meet various in-process manufacturing requirements and commercial end use requirements.

A non-limiting example of hPP can be an isotactic homopolypropylene. Commercially available examples can include, but are not limited to, FF018F from Braskem, 3271 from Total Petrochemicals, and COPYLENE™ CH020 from Phillips 66.

In some embodiments, polypropylene-ethylene copolymer can be polypropylene with random ethylene units. A few non-limiting examples of commercially available "polypropylene-ethylene copolymer" are 6232, 7250FL, and Z9421 from Total Petrochemicals, 6D20 and DS6D81 from Braskem, and PRO-FAX® RP311H and ADSYL® 7415XCP from LyondellBasell.

In some embodiments, polypropylene based thermoplastic polyolefin ("TPO") can be hPP or polypropylene-ethylene copolymer which also have ethylene-propylene copolymer rubber in amounts great enough to give the TPO plastomeric, elastoplastomeric, and/or elastomeric properties. Non-limiting examples of TPO polymers can include those polymers commercially available under the trade names THERMORUN® and ZELAS® from Mitsubishi Chemical Corporation, ADFLEX® and SOFTELL® from LyondellBasell, TELCAR® from Teknor Apex Company, and WELNEX™ from Japan Polypropylene Company. TPO can be produced via multi-stage polymerization (for example, ZELAS®, ADFLEX®, SOFTELL®, and WELNEX®) or by blending (for example, THERMORUN® and TELCAR®).

In some embodiments, polypropylene based thermoplastic polyolefin vulcanizate ("TPV") is hPP or polypropylene-ethylene copolymer which also have vulcanized ethylene-propylene copolymer rubber in amounts great enough to give the TPV plastomeric, elastoplastomeric, or elastomeric properties. Non-limiting examples of TPV polymers are those polymers commercially available under the trade names SANTOPRENE® TPV from Celanese Corporation, SARLINK® TPV from Teknor Apex Company, and ENFLEX® V and EZPRENE® from Ravago Manufacturing.

In some embodiments, polyethylene includes, but is not limited to, a broad range of low density, linear low density, and olefin block copolymer (OBC) polyethylenes which can be employed in the composition to meet various in-process manufacturing requirements and commercial end use requirements.

"LDPE" is low density polyethylene homopolymer commonly produced in high pressure tubular and autoclave reactors. In the reaction, gaseous ethylene monomer is polymerized under very high pressures and high temperatures in the presence of oxide initiators to produce a polymer structure with long and short branches. LDPE is one of the most widely commercially produced commodity thermoplastic worldwide and manufactured by both by large multinational corporations (Dow, ExxonMobil, LyondellBasell, Sinopec, PetroChina, SABIC, Borealis, etc.) and mid-to-smaller companies (Westlake, Nova, Japan Polyethylene, Repsol, PKN Orlen, Carmel, etc.) Non-limiting examples of commercial LDPE grades are marketed under various tradenames. For example, the LDPE manufacturers listed above sell commercial grades under the tradenames Dow™ LDPE (Dow), ExxonMobil™ LDPE (ExxonMobil), SINOPEC LDPE, (Sinopec), SABIC® LDPE, Borealis LDPE, Westlake Polyethylene™ (Westlake), NOVAPOL® (Nova), NOVATEC®-LD (Japan Polyethylene), REPSOL Alcudia and REPSOL PE Ultraclean® (Repsol), Malen (Orlen), and Ipethene® (Carmel).

"LLDPE" is linear low density polyethylene commonly produced in low pressure fluidized bed reactors at significantly lower temperatures than LDPE. In the reaction, gaseous ethylene monomer (and very commonly additional $\alpha$-olefin comonomers) is/are polymerized by multi-site transition metal Ziegler-Natta type catalysts to produce a substantially linear polymer structure with branching that, compared to LDPE, exhibits significantly more but shorter branches. Long chain branching is absent in LLDPE.

LLDPE can be a polyethylene homopolymer but is more commonly produced commercially as a random copolymer or random terpolymer. Most commercial LLDPE is copolymerized with at least one C3-C20 $\alpha$-olefin of which 1-butene, 1-hexene, and 1-octene are the most typical.

Many producers of LDPE polymer also manufacture LLDPE polymer. Non-limiting examples of commercial LLDPE grades from the LDPE manufacturers listed above are marketed and sold under the tradenames Dow™ LLDPE and Dowlex™ (Dow), ExxonMobil™ LLDPE and ExxonMobil™ NTX LLDPE (ExxonMobil), SINOPEC LLDPE (Sinopec), SABIC® LLDPE (Sabic), Borealis LLDPE and Borstar® (Borealis), HIFOR® and HIFOR Xtreme® (Westlake), NOVAPOL® and SCLAIR® and SURPASS® (Nova), and NOVATEC®-LL (Japan Polyethylene).

Polyethylene-based "OBC" is a multi-block LLDPE copolymer containing harder crystallizable LLDPE copolymer "blocks" alternating with amorphous softer LLDPE copolymer "blocks" that are not randomly distributed—that is, in a controlled (non-random) block sequence. The softer block comprises a higher amount of comonomer (most common are C3-C20 $\alpha$-olefin) than the harder block. OBC is produced in a reactor by tandem catalysis using two "post-metallocene" (non-metallocene single-site and/or non-metallocene single-site capable) catalysts—one for polymerization of each block. Polymer synthesis occurs by transferring the polymer chain from one catalyst to the other (and vice-versa) and is referred to as "chain shuttling copolymerization". An example of OBC LLDPE copolymer includes, but is not limited to, the INFUSE™ OBC product line from Dow. In the commercially produced INFUSE™ OBC product line, the copolymer is 1-octene in both the harder and softer blocks.

In some embodiments, monomers used to produce the polypropylene(s) and/or polyethylene(s) can be petroleum and/or bio-based (i.e., plant based) and can be sourced as virgin material and/or sourced from a recycling method such as chemical or pyrolytic recycling. In some embodiments, the polypropylene(s) and/or polyethylene(s) can also be recycled polymers. In some embodiments, the recycled polymers can be "PCR" type (post-consumer recycled/post-consumer resin) and/or "PIR" type (post-industrial recycled/post-industrial resin).

In some embodiments, the foamable compositions of the extrudable foamable sheet can have at least one polypropylene having a melt flow index from about 0.1 to about 25 grams per 10 minutes at 230° C. In some embodiments, the composition of the extruded foamable sheet can also contain at least one polyethylene having a melt flow index from about 0.1 to about 25 grams per 10 minutes at 190° C. In some embodiments, the melt flow index of the polypropylene(s) and/or polyethylene(s) can be about 0.3 to about 20 grams per 10 minutes at 230° C. and at 190° C., respectively, or about 0.5 to about 15 grams per 10 minutes at 230° C. and at 190° C., respectively. The "melt flow index" (MFI) value for a polymer provided herein can be defined and measured according to ASTM D1238 at 230° C. for polypropylenes and at 190° C. for polyethylenes using a 2.16 kg plunger for 10 minutes. The test time may be reduced for relatively high melt flow resins.

The MFI can provide a measure of flow characteristics of a polymer and is an indication of the molecular weight and processability of a polymer material. High MFI values correspond to low viscosities. If the MFI values are too high, extrusion according to the present disclosure may not be satisfactorily carried out. Problems associated with MFI values that are too high can include low pressures during extrusion, problems setting the thickness profile, uneven cooling profile due to low melt viscosity, poor melt strength, and/or machine problems. Conversely, low MFI values can correspond to high viscosities. MFI values that are too low can cause high pressures during melt processing, sheet quality and profile problems, and higher extrusion temperatures which cause a risk of foaming agent decomposition and activation.

The above MFI ranges may be important for foaming processes because they can reflect the viscosity of the material, which has an effect on the foaming. Without being bound by any theory, it is believed there are several reasons why particular MFI values may be more effective. A lower MFI material may improve some physical properties as the molecular chain length is greater, creating more energy needed for chains to flow when a stress is applied. Also, the longer the molecular chain (MW), the more crystal entities the chain can crystallize, thus providing more strength through intermolecular ties. However, at too low an MFI, the viscosity can become too high. On the other hand, polymers with higher MFI values can have shorter chains. Therefore, in a given volume of a material with higher MFI values, there may be more chain ends on a microscopic level relative to polymers having a lower MFI, which can rotate and create free volume due to the space needed for such rotation (e.g., rotation occurring above the Tg, or glass transition temperature of the polymer). This can increase the free volume and enable an easy flow under stress forces which may cause cell degradation and "foam collapse" of the foamed polymer blend.

In addition to the polymers, the compositions fed into the extruders may also contain additives compatible with producing the disclosed polyolefin foams. Common additives include, but are not limited to, chemical foaming agents (CFA), crosslinking promoters, organic peroxides, antioxidants, lubricants, processing aids, thermal stabilizers, colorants, flame retardants, antistatic agents, electrostatic dissipative agents, nucleating agents, plasticizers, antimicrobials, fungicides, light stabilizers, UV absorbents, anti-blocking agents, fillers, deodorizers, odor adsorbers, anti-fogging agents, volatile organic compound (VOC) adsorbers, semi-volatile organic compound (SVOC) adsorbers, thickeners, cell size stabilizers, metal deactivators, chemical foaming agent (CFA) decomposition accelerants, chemical foaming agent (CFA) suppressants, optical clarifiers, and combinations thereof.

In some embodiments, the foamable composition can contain a chemical foaming agent (CFA). In some embodiments, the extrusion temperature for the foamable composition can be at least 10° C. below the thermal decomposition initiation temperature of the chemical foaming agent. If the extrusion temperature exceeds the thermal decomposition temperature of the foaming agent, then the foaming agent may decompose, resulting in undesirable "prefoaming."

In some embodiments, the foamable composition can include a variety of different chemical foaming agents and can include exothermic and endothermic types. Examples of chemical foaming agents include, but are not limited to, azo compounds, hydrazine compounds, carbazides, tetrazoles, nitroso compounds, and carbonates. In addition, a chemical foaming agent may be employed alone or in any combination. One chemical foaming agent that can be used in some embodiments is azodicarbonamide (ADCA). Two examples of commercially produced ADCA chemical foaming agents are UNIFOAM™ AZ TC-18I (100% ADCA) made by P. T. Lauten Otsuka Chemical and VINYFOR™ AC-961 (≥90% ADCA) made by EIWA Chemical. ADCA's thermal decomposition typically occurs at temperatures between about 190 to 230° C. In some embodiments, in order to prevent ADCA from thermally decomposing in the extruder, extruding temperature can be maintained at or below 190° C.

In some embodiments, the amount of chemical foaming agent can depend on the unfoamed sheet thickness, desired foam thickness, desired foam density, materials being extruded, crosslinking percentage, type of chemical foaming agent (different foaming agents can generate significantly different quantities of gas), among others, or combinations thereof. For example, when comparing ADCA to the chemical foaming agent p-toluenesulfonyl semicarbazide ("TSS"), if a foamable sheet contains 40 PHR ADCA, then about 63 PHR TSS would be required to generate about the same amount gas during the foaming step.

Regardless of how ingredients of the foamable composition are fed into the extruder, the shearing force and mixing within an extruder can be sufficient to produce a homogenous foamable sheet (otherwise referred to herein as a layer, film, structure, etc.). Co-rotating and counter-rotating twin screw extruders can provide sufficient shearing force and mixing thru the extruder barrel to extrude a foamable sheet with uniform properties.

Specific energy can be an indicator of how much work is being applied during the extrusion of the ingredients and how intensive the extrusion process is. Specific energy is defined as the energy applied to a material being processed by the extruder, normalized to a per kilogram basis. The specific energy can be quantified in units of kilowatts of applied energy per total material fed in kilograms per hour. Specific energy can be calculated according to the formula:

$$\text{Specific Energy} = \frac{KW(\text{applied})}{feedrate\left(\frac{\text{kg}}{\text{hr}}\right)},\ \text{where}$$

$$KW(\text{applied}) = \frac{\begin{array}{c}KW(\text{motor rating})* \\ (\%\ \text{torque from maximum allowable in decimal form})* \\ \text{RPM (actual running RPM)}*0.97(\text{gearbox efficiency})\end{array}}{\text{Max RPM(capability of extruder)}}$$

Specific energy can be used to quantify the amount of shearing and mixing of the ingredients within the extruder. Extruders used to form the foamable sheets disclosed herein can be capable of producing a specific energy of at least about 0.020 kW·hr/kg, at least about 0.025 kW·hr/kg, at least about 0.050 kW·hr/kg, or at least about 0.100 kW·hr/kg.

If the difference between the decomposition temperature of the thermally decomposable foaming agent and the melting point of the polymer with the highest melting point is high, then a catalyst for foaming agent decomposition may be used. Exemplary catalysts include, but are not limited to, zinc oxide, magnesium oxide, calcium stearate, glycerin, and urea. The lower temperature limit for extrusion can be that of the polymer with the highest melting point. If the extrusion temperature drops below the melting temperature of the polymer with the highest melting point, then undesirable "unmelts" may appear. Upon foaming, the sheet that was extruded below this lower temperature limit can exhibit uneven thickness, a non-uniform cell structure, pockets of cell collapse, and/or other undesirable attributes.

Regardless of whether the foaming agents are physical, chemical, or a combination, typical extrusion foaming can generate foamed polymer sheets where both primary surfaces are significantly rougher than equivalent foamed polymer sheets produced in the disclosed method. The surface profile of a foamable or foamed sheets (particularly a side not laminated to a textile) can be important in many applications and thus extrusion foamed sheets may not be used for these applications. These applications can include a smooth foam surface to obtain desired properties such as improving the percentage contact area when a pressure sensitive adhesive (PSA) is applied onto the foam surface; ease of lamination to a film, fabric, fiber layer, and a leather; percentage contact area in the lamination; and/or visual aesthetics; etc. PCT Publication WO 2016109544, which is hereby incorporated in its entirety by reference, includes examples illustrating the difference in surface roughness between extrusion foamed polymer sheets and equivalent foamed polymer sheets produced by the disclosed method.

The rougher surfaces of extrusion foamed sheets can be generally caused by larger sized cells (when compared to the foams produced according to the present disclosure). Although the cell size and cell size distribution may not matter in many commercial applications, because surface roughness is a function of cell size, foams with larger cells can be less desirable than foams with smaller cells for applications requiring a smoother foam surface.

FIG. 1 illustrates an exemplary foam lamination production process in accordance with some embodiments disclosed herein. In contrast to the typical foam lamination process, the laminating takes place during the extrusion step. Specifically, the extruder can deliver a steady amount of a foamable composition into an extruder die 6 to create an unfoamed or foamable sheet. The unfoamed extrudate can then be sent through a laminating nip 34. In some embodiments, the extruded foamable sheet is sent directly to the laminating nip after leaving the extruder die. In some embodiments, the laminating nip can include a plurality of rollers 3, 4 (e.g., pressure rollers, hard rollers, etc.). In order for the foamable sheet to be laminated to a textile, a textile can also be fed to the laminating nip 34. For example, a textile can be unwound from textile unwinder 14 and fed to laminating nip 34 such that the textile is laminated to a side or surface of the extruded foamable sheet.

In some embodiments, lamination of a textile to the unfoamed extruded composition/sheet can be obtained via melt bonding between the two without adhesion assistance from a high or low melt laminating film, liquid adhesive, powder melt adhesive, adhesion primer, and/or the like. In other words, since both the textile and the unfoamed extruded composition can be polyolefinic, the two can be compatible and can be miscible at the bond line between the textile and melted extruded composition upon nipping.

In some embodiments, the plurality of rollers can apply pressure to a side of the extruded unfoamed sheet opposite the textile and can apply pressure to a side of the textile opposite the extruded unfoamed sheet. In some embodiments, the laminating nip can include at least two rollers and, in some embodiments, the laminating nip can include at least three rollers.

In some embodiments, the textile can include a polyolefin (i.e., polyolefin textile). In some embodiments, the composition of a textile can include at least one polypropylene disclosed herein and/or at least one polyethylene disclosed herein. Most commercially produced textiles are either hPP, polypropylene-ethylene copolymer, or high density polyethylene ("HDPE").

"HDPE" is high density polyethylene commonly produced under low pressure polymerization of ethylene monomers in gas phase, slurry, or solution reactors. In the reaction, gaseous ethylene monomer (and sometimes $\alpha$-olefin comonomer(s)) is/are polymerized by multi-site transition metal Ziegler-Natta or activated chromium oxide type catalysts to produce a substantially linear polymer structure with limited to no branching from the main molecular chain. HDPE can be either a polyethylene homopolymer or random copolymer and both are produced commercially. When commercial HDPE is copolymerized, it is copolymerized with at least one $C_3$-$C_{20}$$\alpha$-olefin of which 1-butene, 1-hexene, and 1-octene are the most typical.

Many producers of LDPE and LLDPE polymer also manufacture HDPE polymer. Non-limiting examples of commercial HDPE grades from the LDPE manufacturers listed previously are marketed and sold under the tradenames Dow™ HDPE (Dow), ExxonMobil™ HDPE and PAXON™ HDPE (ExxonMobil), SINOPEC HDPE (Sinopec), SABIC® HDPE and SABIC® VESTOLEN A (Sabic), Borealis HDPE (Borealis), NOVAPOL® and SCLAIR® and SURPASS® (Nova), NOVATEC™-HD (Japan Polyethylene), REPSOL Alcudia and REPSOL Healthcare® (Repsol), and Liten (Orlen).

In some embodiments, commercially produced textiles composed of hPP, polypropylene-ethylene copolymer, or HDPE can also include other non-olefinic materials including non-olefinic polymers, natural fibers, and/or animal-based fibers. Non-olefinic polymers can include, but are not limited to, polyamides, polyesters, polyether-polyurea copolymers, and/or cellulosics. Natural fibers can include, but are not limited to, cotton, hemp, and/or linen. Animal-based fibers can include, but are not limited to, wool and/or silk.

In some embodiments, the textiles may also contain compatible additives. Common additives can include, but are not limited to, antioxidants, lubricants, processing aids, thermal stabilizers, colorants, flame retardants, antistatic agents, electrostatic dissipative agents, nucleating agents, plasticizers, antimicrobials, fungicides, light stabilizers, UV absorbents, anti-blocking agents, fillers, deodorizers, odor adsorbers, anti-fogging agents, and combinations thereof.

In some embodiments, the non-olefinic content (including additives) of the textiles can be at most 30 wt. %, at most 20 wt. %, at most 10 wt. %, or at most 5 wt. %. In some embodiments, the non-olefinic content (including additives) of the textiles can be at least about 0.1 wt. %, at least about 1 wt. %, at least about 5 wt. %, at least about 10 wt. %, or at least about 20 wt. %.

In some embodiments, the textiles can be wovens and/or knits. In some embodiments, woven textiles are made by interlacing two or more filaments, yarns, and/or threads perpendicular to one another. Various weave patterns can be employed such as plain weave (also known as a square weave), twill, satin, basket, leno, jacquard, herringbone, tapestry, pile, and/or dobby, etc. Examples of woven textiles can include cloths, fabrics, and meshes.

In some embodiments, knitted textiles (also commonly called knitted fabrics) are made by inter-looping filaments, yarns, and/or threads or the inter-meshing of loops of filaments, yarns, and/or threads. Two basic varieties of knits are weft-knit and warp-knit. Weft-knit stich patterns can include, but are not limited to, stockinette (also known as stocking and plain stich), jersey, circular, purl, double, cable, fair isle, and/or aran, etc. Warp-knit stich patterns can include, but are not limited to, tricot, mirrow satin, power-net, satinet, weftlock, tri-skin, jacquard, simplex, crochet, Milanese, Raschel, and/or Ketten Raschel, etc. Examples of knitted textiles can include cloths.

To assist with feeding the textile uniformly through the laminating nip, the textile unwinder can have a tension control mechanism. In some embodiments, tension applied to the textile in the machine direction can ensure that the textile does not undesirably crease, wrinkle, and/or feed non-uniformly through the nip. In some embodiments, machine direction tension can stretch the textile. In some embodiments, a tenter can be used (with or without machine direction tension) to apply tension to the textile in the cross-machine direction to ensure that the textile does not undesirably crease, wrinkle, and/or feed non-uniformly through the nip. In some embodiments, the tenter is an endless track with clips or hooks along both sides of the textile used for applying tension to the textile in the cross-machine direction. In some embodiments, cross-machine direction tension can also stretch the textile.

In some embodiments, a textile can be laminated to one side of the extruded foamable sheet. In some embodiments, a textile can be laminated to both sides of the extruded foamable sheet. In other words, two textiles (one on each side of the extruded foamable sheet) can be fed through the plurality of rollers such that a textile is laminated on each side of the extruded foamable sheet. For embodiments where the textile is laminated on only one side of the extruded foamable sheet, the thickness of the unfoamed laminated sheet can be measured using a thickness gauge where the textile side of the unfoamed laminate can be placed on a flat level surface and contacted on the unlaminated side of the unfoamed extruded composition by a spring loaded plunger incorporated with the gauge. A 3 mm hemispherical diameter tip can be attached to the plunger and contact the sheet at 26.5+/−3.5 gram-force.

In some embodiments, the thickness of the unfoamed extruded sheet laminated with a textile can be about 0.3 to about 30 mm and the thickness of the textile can be from about 0.15 to about 2 mm. In some embodiments, the textile can be embedded into the surface of the extruded foamable sheet to varying degrees. Factors effecting this embedding can include, but are not limited to, the applied nip pressure, the melt properties of the extruded polymeric composition, the percentage openness of the textile, the textile pattern, the dimension(s) of the filament(s), yarn(s), or thread(s) of the textile, etc.

In some embodiments, after the textile is laminated to the unfoamed or foamable sheet, the unfoamed laminate can be wound up via a laminated sheet rewinder 7. In some embodiments, the laminate can be unwound via a laminated sheet unwinder 8 and fed into the irradiation unit 9. In some embodiments, the unfoamed laminate can be sent directly to the irradiation unit after lamination. In some embodiments, the irradiation unit can perform any of the irradiation techniques described herein.

There is a difference between "physical" crosslinking and "chemical" crosslinking. In chemical crosslinking, the crosslinks are generated with crosslinking promoters but without the use of ionizing radiation. Chemical crosslinking typically involves using peroxides, silanes, or vinylsilanes. In peroxide crosslinking processes, the crosslinking typically occurs in the extrusion die. For silane and vinylsilane crosslinking processes, the crosslinking typically occurs post-extrusion in a secondary operation where the crosslinking of the extruded material is accelerated with heat and moisture. Regardless of the chemical crosslinking method, chemically crosslinked foam sheets can typically exhibit primary surfaces that are significantly rougher than equivalent foam sheets produced in the disclosed method. The surface profile of a foam sheet (particularly a side not laminated to a textile) can be critical in many applications and thus chemically crosslinked foam sheets may not be used for certain applications. These applications can include a smooth foam surface to obtain desired properties such as improving the percentage contact area when a pressure sensitive adhesive (PSA) is applied onto the foam surface; ease of lamination to a film, fabric, fiber layer, and a leather; percentage contact area in the lamination; and/or visual aesthetics; etc. PCT Publication WO 2016109544 includes examples illustrating the difference in surface roughness between chemically crosslinked foamed polymer sheets and equivalent foamed polymer sheets produced by the disclosed method.

The rougher surfaces of chemically crosslinked foamed sheets can be generally caused by larger sized cells (when compared to the foams produced according to the present disclosure). Although the cell size and size distribution may not matter in many commercial applications, because surface roughness is a function of cell size, foams with larger cells can be less desirable than foams with smaller cells for applications requiring a smoother foam surface.

Examples of ionizing radiation include, but are not limited to, alpha, beta (electron beams), x-ray, gamma, and neutron. Among them, an electron beam having uniform energy can be used to crosslink the laminated foamable sheet. Exposure time, frequency of irradiation (i.e., number of passes or number of exposures to radiation), and/or acceleration voltage upon irradiation with an electron beam can vary widely depending on the intended crosslinking degree and the thickness of the unfoamed laminate. However, the ionizing radiation can generally be in the range of from about 10 to about 500 kGy, about 20 to about 300 kGy, or about 20 to about 200 kGy. If the exposure is too low, then crosslinking is too low such that cell stability in the foam layer may not be maintained upon foaming. If the exposure is too high, the irradiated laminate may curl and buckle excessively upon foaming making it difficult to produce a flat and uniform foamed laminate. Also, a highly irradiated laminate may be highly crosslinked, where the crosslinking significantly reduces the ability of the polymer system to substantially elongate. Poor elongation of the polymer system in the foam layer may cause the laminate to tear and burst upon foaming in situations where the expansion of the foam exceeds the ultimate elongation property of the irradiated composition. Also, poor elongation of the polymer system in the textile layer may cause the textile to tear upon foaming in situations where the expansion of the foam exceeds the ultimate elongation property of the textile. Also, the unfoamed laminate may be softened by exothermic heat release upon exposure to the electron beam radiation such that the laminate can deform when the exposure is too high. In addition, the polymer components may also be degraded from excessive polymer chain scission.

The unfoamed laminated sheet may be irradiated up to four separate times, no more than twice, or only once. If the irradiation frequency is more than about four times, the polymer components may suffer degradation so that upon foaming, for example, uniform cells will not be created in the resulting foam. When the thickness of the unfoamed laminated sheet is greater than about 4 mm, irradiating each surface of the laminate with an ionized radiation can make the degree of crosslinking for the full depth of the laminate more uniform.

Irradiation with an electron beam provides an advantage in that unfoamed laminates having various thicknesses can be effectively crosslinked by controlling the acceleration voltage of the electrons. The acceleration voltage can generally be in the range of from about 200 to about 1500 kV, about 300 to about 1200 kV, or about 400 to about 1000 kV. If the acceleration voltage is less than about 200 kV, then the radiation may not reach the inner portion of the unfoamed laminate. As a result, the cells in the foamable portion of the laminate can be coarse and uneven upon foaming. Additionally, acceleration voltage that is too low for a given thickness can cause arcing, resulting in "pinholes" or "tunnels" in the foamed laminate. On the other hand, if the acceleration voltage is greater than about 1500 kV, then the polymers may degrade from exposure to excessive radiation.

Regardless of the type of ionizing radiation selected, crosslinking is performed so that the composition of the laminate is crosslinked to about 15% to about 75% or about 30% to about 50% as measured by the "Toray Gel Fraction Percentage Method." According to the "Toray Gel Fraction Percentage Method," tetralin solvent is used to dissolve non-crosslinked components in a laminate. In principle, the non-crosslinked material is dissolved in tetralin and the crosslinking degree is expressed as the weight percentage of crosslinked material in the laminate. The apparatus used to determine the percent of polymer crosslinking includes: 100 mesh (0.0045 inch wire diameter) Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each laminate sample, 100 milligrams±5 milligrams of sample is weighed out and transferred to the wire mesh bag. The weight of the wire mesh bag and the sample, typically in the form of thinly sliced laminate cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula 100*(C−A)/(B−A), where A=empty wire mesh bag weight; B=wire bag weight+laminate sample before immersion in tetralin; and C=wire bag weight+dissolved sample after immersion in tetralin.

A crosslinking promoter can optionally be added to the extruded unfoamed or foamable sheet to reduce the exposure of the laminate to ionizing radiation to obtain a desired gel. Suitable crosslinking promoters include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking promoters may be used alone or in any combination.

Crosslinking promoters can vary in crosslinking efficiency based on the ionizing radiation dosage, the polymers being crosslinked, the chemical makeup and structure of the monomer, the number of functional groups on the monomer, and/or whether the monomer is a liquid or a powder.

Commercially produced polyolefin textiles are typically manufactured without a crosslinking promoter. In some embodiments, where the polyolefinic textile is substantially free of crosslinking after the irradiation of the unfoamed laminate, the textile layer-upon reaching its melting temperature in the foaming step—can undesirably loose structural integrity causing the textile to drip, flow, and/or in some cases fuse into a non-uniform film layer upon cooling to where the original textile layer is no longer recognizable as a textile. To avoid the issue of a substantially uncrosslinked textile, a polyolefinic textile can be pared with an appropriate foamable composition. Polyethylenes typically readily crosslink upon exposure to ionizing radiation-even without a crosslinking promoter-so laminating a polyethylene textile with an extruded foamable polyethylene composition can ensure that the polyethylene textile crosslinks.

However, polypropylenes typically do not readily crosslink upon exposure to ionizing radiation without a crosslinking promoter. Thus, laminating a polypropylene textile with an extruded foamable polyethylene composition (without a crosslinking promoter) can be undesirable. To obtain crosslinking for a polypropylene textile layer, the extruded foamable composition may include a liquid crosslinking promoter. Upon laminating the polypropylene textile with the extruded foamable composition, sufficient time can be given to allow at least some of the crosslinking promoter to diffuse from the extruded foamable layer into the textile layer prior to irradiating the laminate. Variables that can effect the diffusion rate, and thus the waiting time from lamination to irradiation include, but are not limited to, the monomer used for crosslinking promotion, the amount of crosslinking promoter in the extruded composition, the percentage contact area between the foamable layer and the textile layer, the weave of the textile, and/or types of polymers composing the foamable layer and textile layer, among other factors. For the disclosed examples herein below, all textiles were polypropylene laminated to a layer of polypropylene/polyethylene blend containing a divinylbenzene crosslinking promoter. A time from about 8 to about 9 days was provided to allow the crosslinking promoter to diffuse into each textile layer. In some embodiments, the time between forming the laminate and irradiating the laminate is at least about 1 day, at least about 2 days, at least about 5 days, at least about 8 days, at least about 9 days, or at least about 10 days.

Crosslinks may be generated using a variety of different techniques and can be formed both intermolecularly, between different polymer molecules, and intramolecularly, between portions of a single polymer molecule. Such techniques include, but are not limited to, (a) exposing the polymer molecules to ionizing radiation, (b) providing crosslinking promoters which are separate from a polymer chain and exposing the crosslinking promoters and polymers to ionizing radiation, and/or (c) providing polymer chains which incorporate a crosslinking promoter as a functional group which can form a crosslink or be activated to form a crosslink.

After irradiating the laminate, foaming may be accomplished by a foaming unit 10. In some embodiments, the irradiated laminate can be sent directly to the foaming unit after irradiating. In some embodiments, the irradiated laminate can be wound up after irradiation and, at a later time, the wound irradiated laminate can be unwound and fed to the foaming unit for foaming. In some embodiments, the foaming unit can perform any of the foaming techniques described herein.

In some embodiments, foaming may be accomplished by heating the crosslinked laminate to a temperature higher than the decomposition temperature of the thermally decomposable blowing agent. In some embodiments, the foaming can be performed at about 200-260° C. or about 220-240° C. in a continuous process. In some embodiments, continuous foaming process can be preferred over a batch process for production of a continuous foamed laminate.

The foaming can be typically conducted by heating the crosslinked laminate with molten salt, radiant heaters, vertical or horizontal hot air oven, microwave energy, or a combination of these methods. The foaming may also be conducted in an impregnation process using, for example, nitrogen in an autoclave, followed by a free foaming via molten salt, radiant heaters, vertical or horizontal hot air oven, microwave energy, or a combination of these methods. Optionally, before foaming, the crosslinked laminate can be softened with preheating. This can help stabilize the expansion of the laminate upon foaming, particularly with thick and stiff laminate.

The density of the foam laminate can be defined and measured using section or "overall" density, rather than a "core" density, as measured by JIS K6767. The foam laminates produced using the above-described method can yield laminate sheets with a section, or "overall" density of about 20-250 kg/$m^3$, about 30-220 kg/$m^3$, or about 35-200 kg/$m^3$. In some embodiments, the section density can be controlled by the amount of blowing agent in the extruded foamable sheet/layer, the thickness of the extruded foamable sheet/layer, and, to a lesser extent, the weave of the textile layer. If the density of the foam laminate is less than about 20 kg/$m^3$, then the sheet may not foam efficiently due to a large amount of chemical blowing agent needed to attain the density. Additionally, if the density of the foam laminate is less than about 20 kg/$m^3$, then the expansion of the sheet during the foaming step may become increasingly difficult to control. Furthermore, if the density of the foam laminate is less than about 20 kg/$m^3$, then the foam may become increasingly prone to cell collapse. Thus, it may be difficult to produce a foam laminate of uniform section density and thickness at a density less than about 20 kg/$m^3$.

The foam laminate is not limited to a section density of about 250 kg/$m^3$. A foam laminate having a section density of about 350 kg/$m^3$, about 450 kg/$m^3$, or about 550 kg/$m^3$ may also be produced. However, the foam laminate may have a density of less than about 250 kg/$m^3$ since greater densities can be generally cost prohibitive when compared to other materials which can be used in a given application.

In some embodiments, the foam layer produced using the above method may have closed cells. In some embodiments, at least 90% of the cells have undamaged cell walls, at least 95%, or more than 98% when measured using a pycnometer according to ASTM D6226 or ISO 4590. For textiles which cover the primary surface(s) of the foam layer to a degree greater than about 20%, the textiles may first be skived from the foam to more accurately quantify the percentage of undamaged cell walls in the foam layer.

In some embodiments, the average cell size in the foam layer can be from about 0.05 to about 1.0 mm, or from about 0.1 to about 0.7 mm when measured according to ASTM D3576. If the average cell size is less than about 0.05 mm, then the density of the foam layer can typically be greater than 250 kg/$m^3$. If the average cell size is larger than 1 mm, the unlaminated foam surface may have an uneven surface. There is also a possibility of the foam layer being undesirably torn if the population of cells in the foam layer does not have the preferred average cell size. This can occur when the laminate is stretched, when a shear force is applied to the laminate and/or when portions of it are subjected to a secondary process. In some embodiments, the cell size in the foam layer may have a bimodal distribution representing a population of cells in the core of the foam which are relatively round and a population of cells in the skin near the surfaces of the foam structure which are relatively flat, thin, and/or oblong.

The overall thickness of the foamed laminate is measured according to JIS K6767 and can be about 0.6 mm to about 50 mm, about 0.7 mm to about 40 mm, about 0.8 mm to about 30 mm, or about 0.9 mm to about 20 mm. If the thickness is less than about 0.6 mm, then foaming may not be efficient due to significant gas loss from the primary surface(s). If the thickness is greater than about 50 mm, expansion during the foaming step can become increasingly difficult to control. Thus, it can be increasingly more difficult to produce a laminate with uniform section density and thickness.

In some embodiments, the desired laminate thickness can be obtained by a secondary process such as slicing, skiving, and/or bonding the foamed layer. Slicing, skiving, and/or bonding the foamed layer can produce a thickness range of about 0.3 mm to about 100 mm.

In some embodiments, after foaming, the foamed laminate can be wound via a laminated foam rewinder 13.

In some embodiments, the structure(s) and/or color(s) of the textile layer(s) of the foamed laminate is/are not retained when compared to the textile structure(s) of the unfoamed laminate. For example, expansion of the laminate in the foaming step for the machine direction (MD) and/or cross-machine direction/transverse direction (abbreviated XMD or CMD or CD or TD) can change the dimensional structure and/or color of the textile(s). Variables effecting the expansion of the foamable layer include, but are not limited to, the chemical blowing agent amount and type(s), the type(s) and quantities of polypropylene and polyethylene in the foam layer, the composition of the textile(s), the thickness of the extruded unfoamed layer, the thickness of the unfoamed laminate, the crosslinked percentage of the laminate, the weave & thickness of the textile(s), the cross sectional dimensions of the textile fiber(s), the foaming temperature, the residence time of the laminate within the heating equipment, and/or the tension imparted on the laminate by both the foaming equipment and gravity, among others. In some embodiments, to obtain a desired textile structure and color on the laminate, suitable textiles, suitable foamable compositions, and suitable processing parameters can be selected to account for the expansion of the laminate in the machine and cross-machine directions in the foaming step.

The textile/foam laminates disclosed herein can be used in a variety of applications. In some embodiments, the textile/foam laminates can be used in automobile interior parts such as door panels, door rolls, door inserts, door stuffers, trunk stuffers, armrests, center consoles, seat cushions, seat backs, headrests, seat back panels, knee bolsters, and/or a headliner. In some embodiments, the textile/foam laminates can also be used in furniture (e.g., commercial, office, and residential furniture) such as chair cushions, chair backs, sofa cushions, sofa trims, recliner cushions, recliner trims, couch cushions, couch trim, sleeper cushions, and/or sleeper trims. In some embodiments, the textile/foam laminates can also be used as a component in footwear. In some embodiments, the textile/foam laminates can also be used as a component in walls such as modular walls, moveable walls, wall panels, modular panels, office system panels, room dividers, and/or portable partitions. In some embodiments, the textile/foam laminates can also be used as a component in storage casing (e.g., commercial, office and residential) which can be either mobile or stationary. In some embodiments, the textile/foam laminates can also be used as a component in trunks, chests, luggage, briefcases, traveling bags, handbags, backpacks, and the like. Furthermore, the textile/foam laminates can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, and/or architectural coverings.

In some embodiments, to satisfy the requirements of any application, the laminates may be subjected to various secondary processes, including but not limited to, corona or plasma treatment, surface roughening, surface smoothing, perforation or microperforation, splicing, slicing, skiving, layering, bonding, and/or hole punching.

EXAMPLES

For the examples, five textiles were laminated to a foamable composition containing polypropylene, polyethylene, a liquid crosslinking promoter, ADCA chemical foaming agent, and a blend of standard antioxidants for polyolefins.

Examples 1a and 1b

Figure 2A:
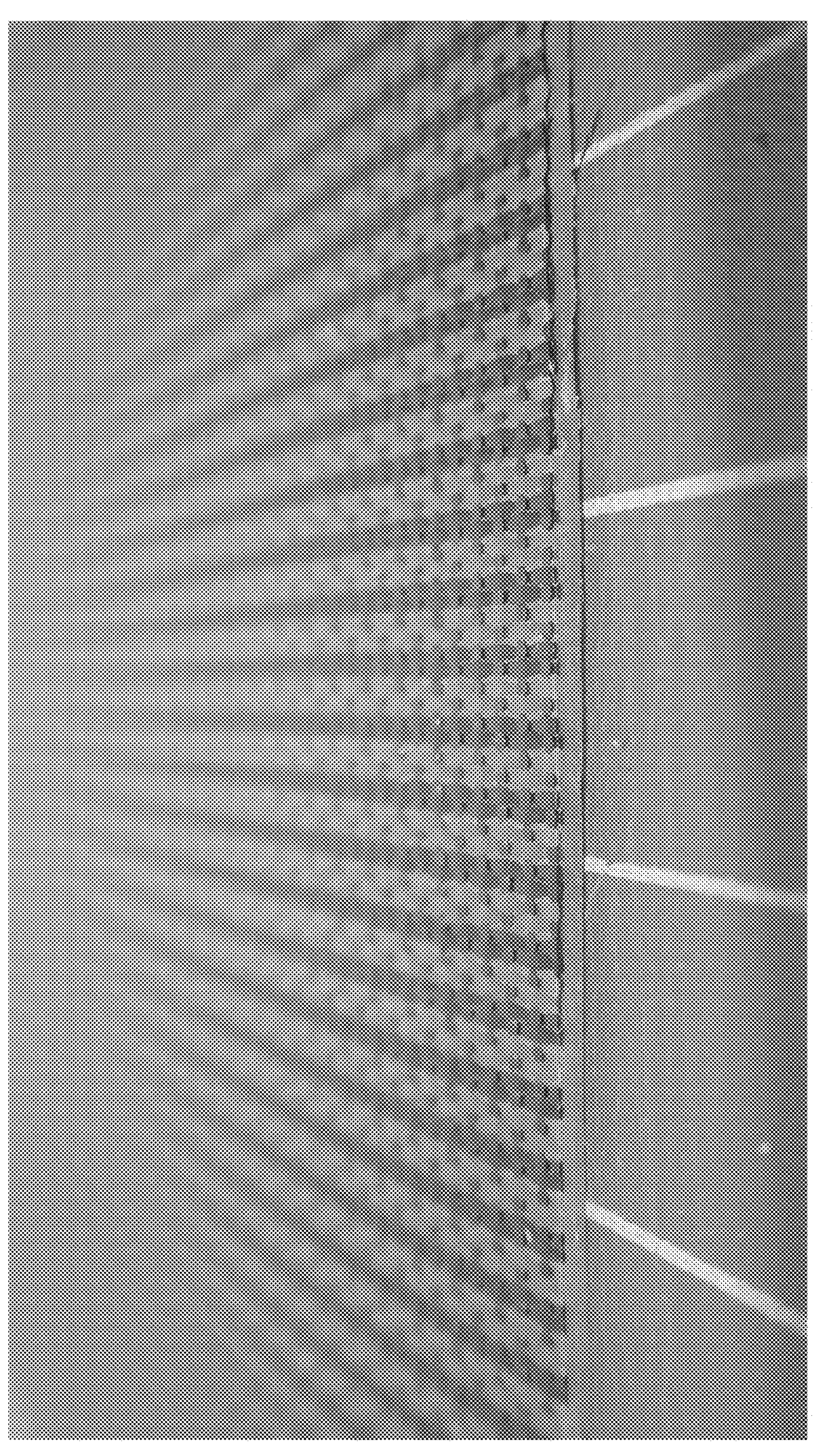
FIG. 2A illustrates an image of the unfoamed laminate used to produce Examples 1a and 1b disclosed herein.
Figure 2B:
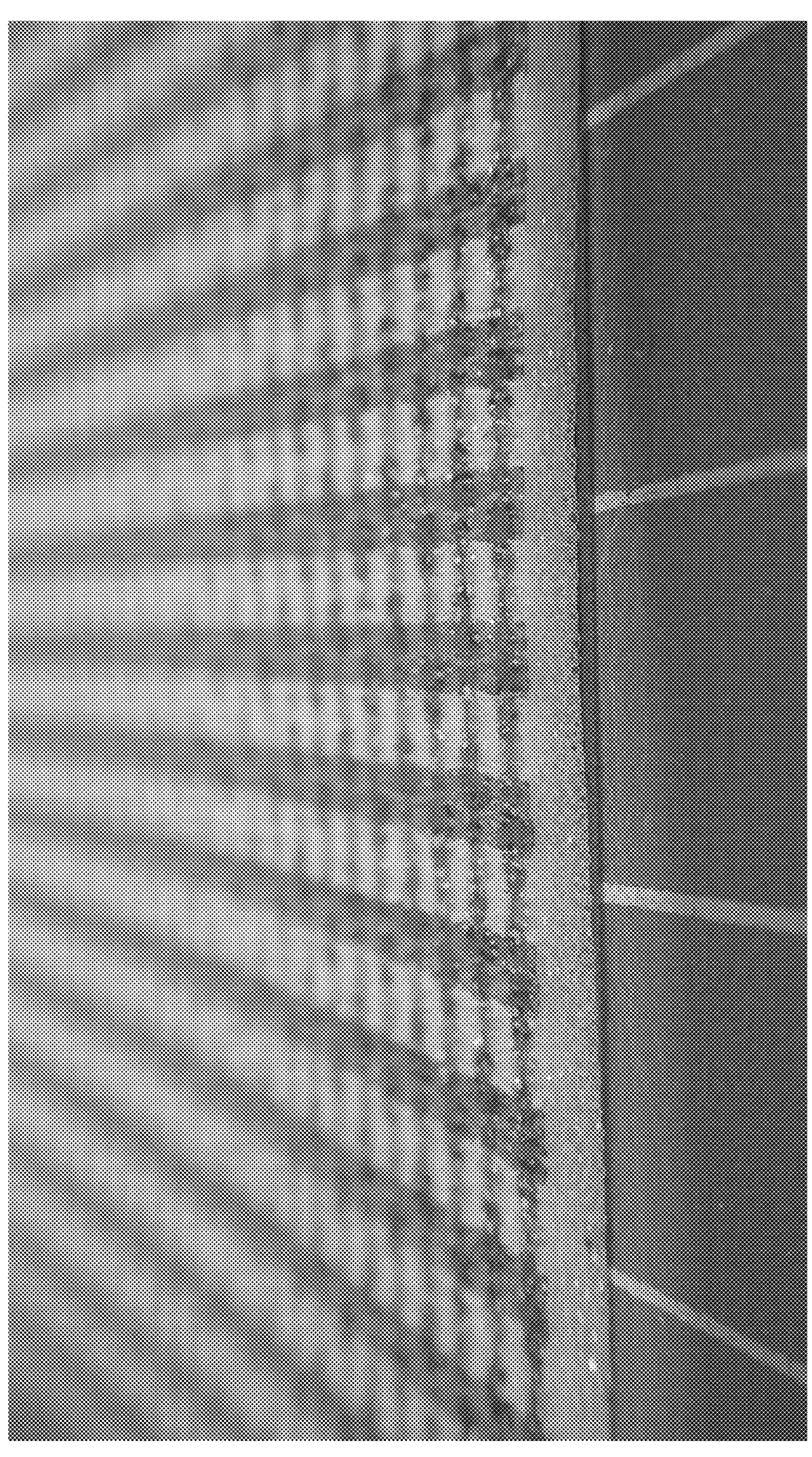
FIG. 2B illustrates an image of the foamed laminate of Example 1a disclosed herein.
Figure 2C:
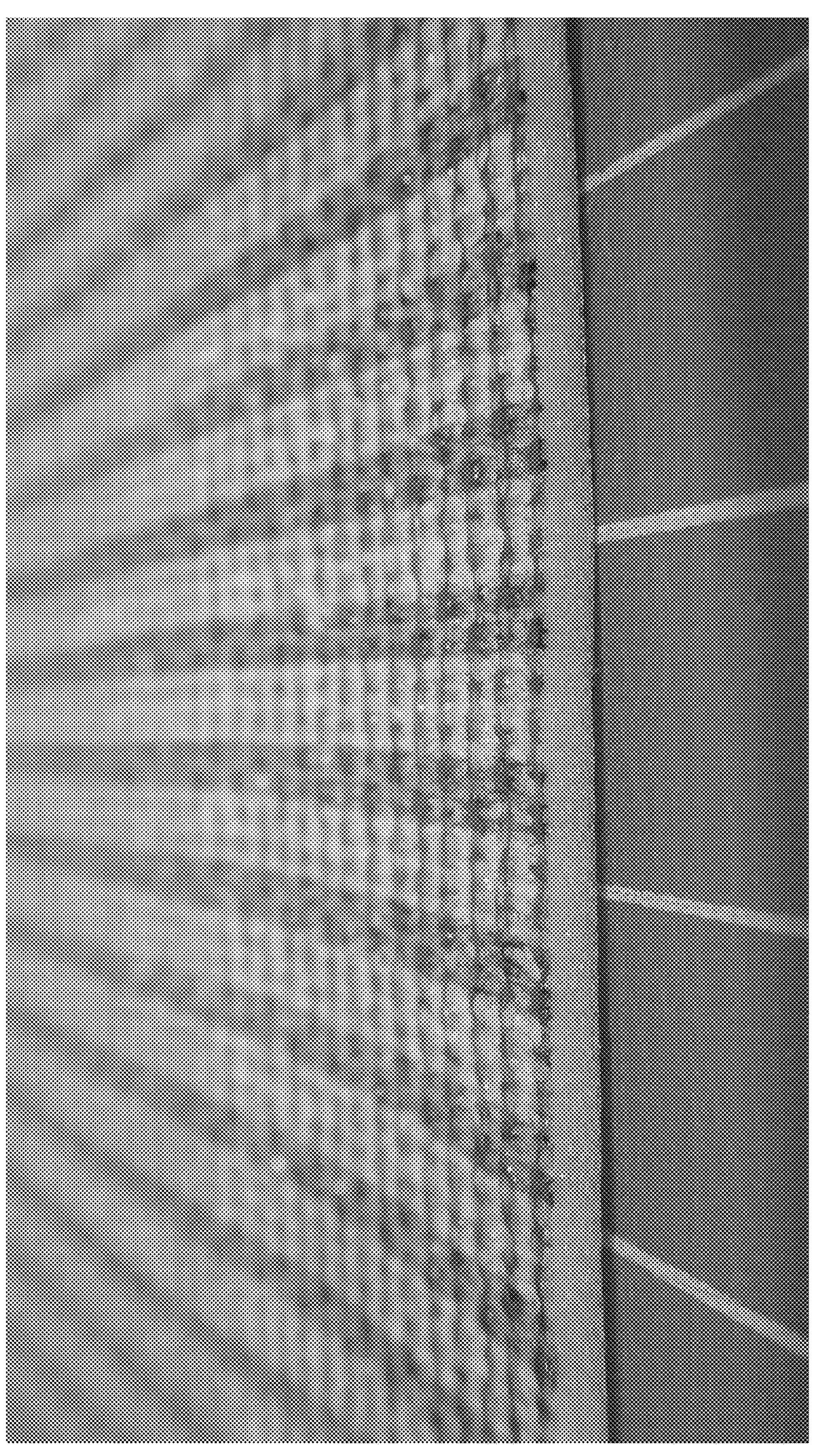
FIG. 2C illustrates an image of the foamed laminate of Example 1b disclosed herein.

A woven textile was laminated to the foamable composition to obtain a laminate with a thickness of 1.27 mm. An image of the unfoamed laminate is shown in FIG. 2A. After 8 days, the laminate was crosslinked via electron beam radiation with a portion of the laminate (Example 1a) irradiated with the textile side facing the electron beam source and a portion of the laminate (Example 1b) irradiated with the foamable composition facing the electron beam source. The Example 1a laminate was foamed via a hot air oven where the air temperature at the entrance to the oven was 467° F. and the air temperature at the exit of the oven was 476° F. With a residence time of 180 seconds in the oven, the laminate expanded 1.71 times in the machine direction and 1.96 times in the cross-machine direction to obtain a foamed laminate of 2.57 mm thick with an overall density of 123 kg/m3 and 39% crosslinking. The Example 1b laminate was foamed via a molten salt bath where the salt temperature was 446° F. at the entrance and exit of the bath. With a residence time of 67 seconds within the bath, the laminate expanded 1.61 times in the machine direction and 2.26 times in the cross-machine direction to obtain a foamed laminate of 2.45 mm thick with an overall density of 122 kg/m3 and 41% crosslinking. Images of the foamed laminate of Example 1a is shown in FIG. 2B and the foamed laminate of Example 1b is shown in FIG. 2C.

Example 2a and 2b

Figure 3A:
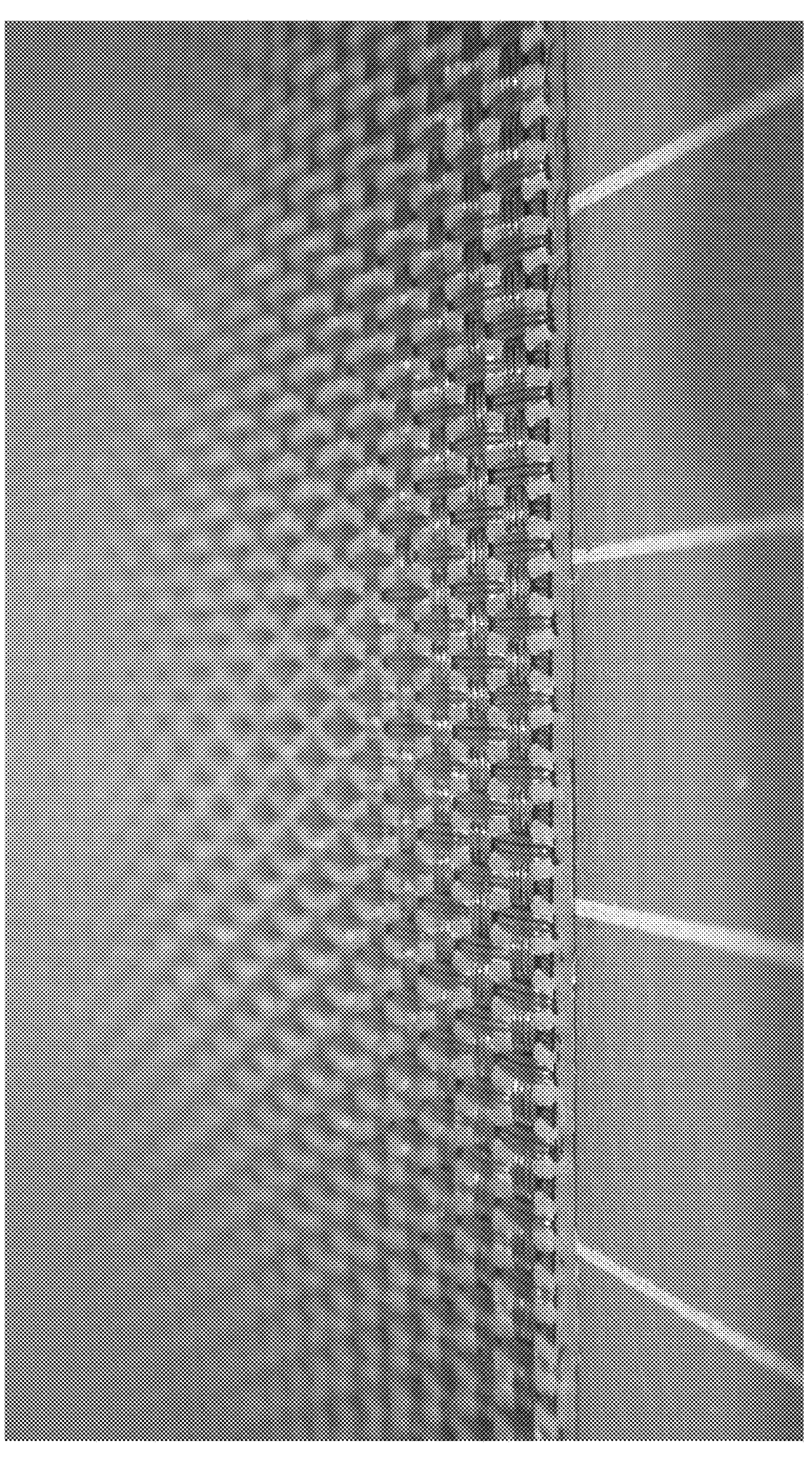
FIG. 3A illustrates an image of the unfoamed laminate used to produce Examples 2a and 2b disclosed herein.
Figure 3B:
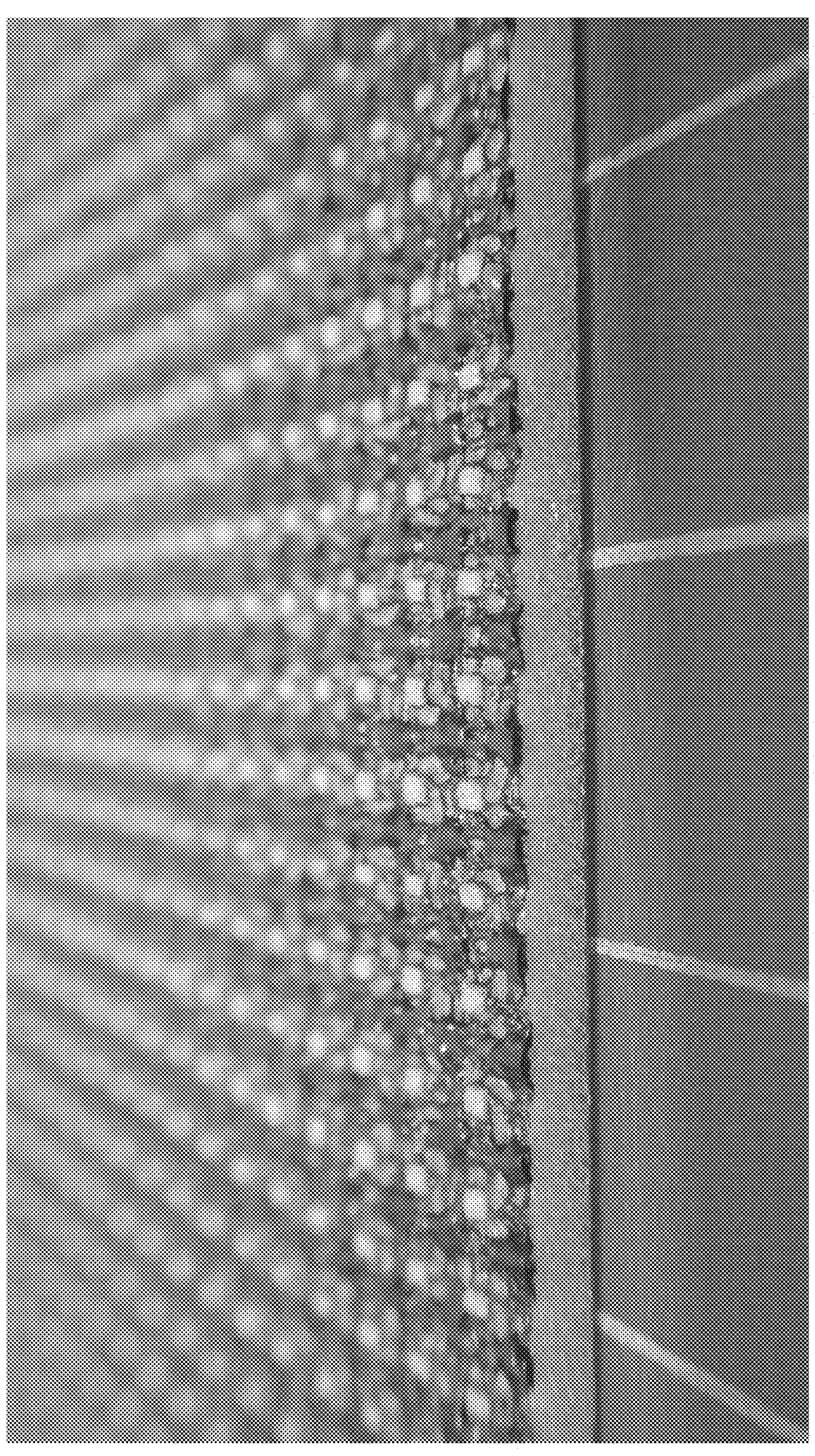
FIG. 3B illustrates an image of the foamed laminate of Example 2a disclosed herein.
Figure 3C:
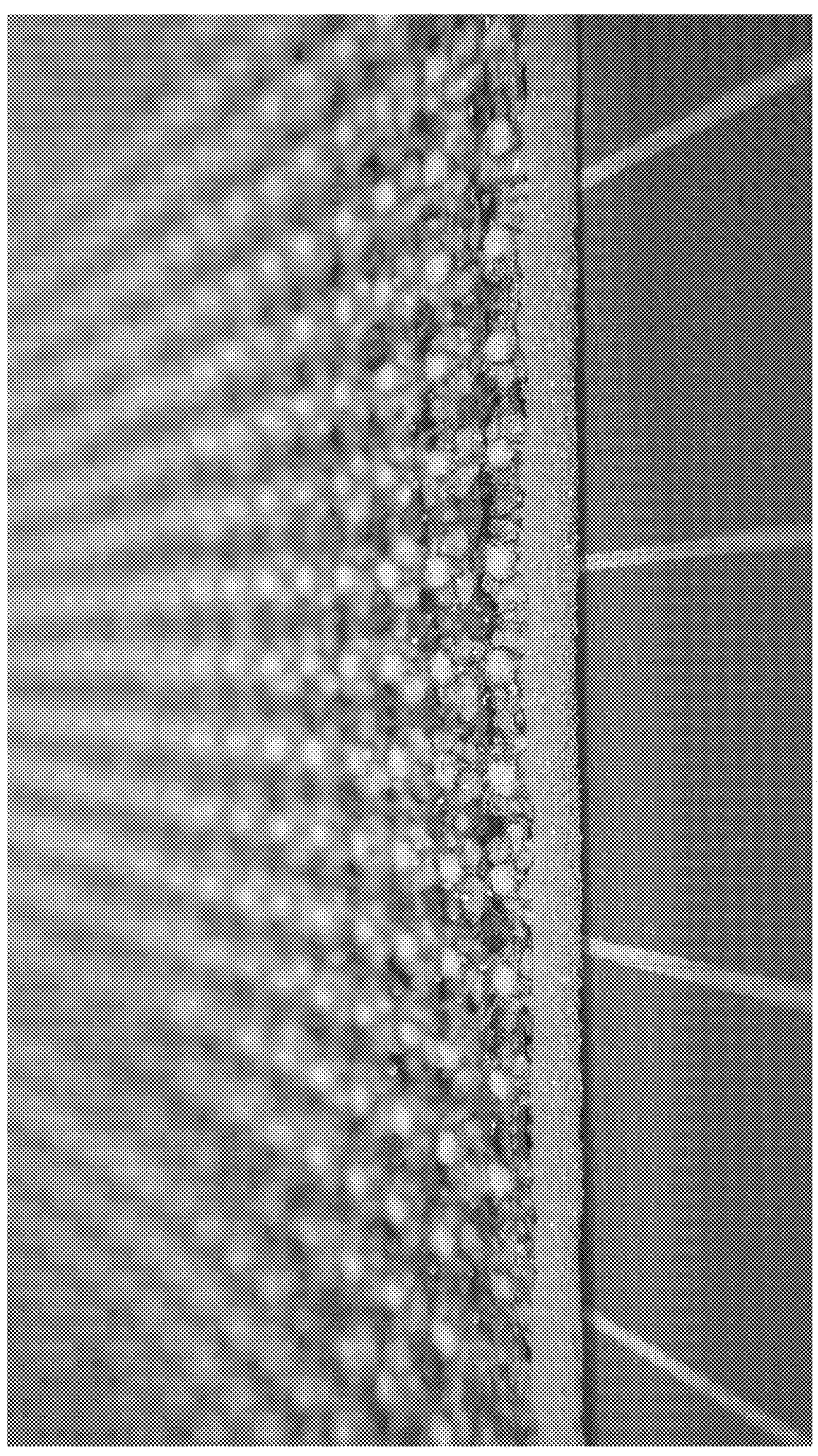
FIG. 3C illustrates an image of the foamed laminate of Example 2b disclosed herein.

A woven textile was laminated to the foamable composition to obtain a laminate with a thickness of 1.34-1.35 mm. An image of the unfoamed laminate is shown in FIG. 3A. After 8 days a portion of the laminate (Example 2a) was crosslinked via electron beam radiation with the foamable composition facing the electron beam source. After 9 days a portion of the laminate (Example 2b) was crosslinked via electron beam radiation with the foamable composition facing the electron beam source. The Example 2a laminate was foamed via a hot air oven where the air temperature at the entrance to the oven was 463° F. and the air temperature at the exit of the oven was 483° F. With a residence time of 260 seconds in the oven, the laminate expanded 1.44 times in the machine direction and 2.31 times in the cross-machine direction to obtain a foamed laminate of 3.58 mm thick with an overall density of 84.4 kg/m3 and 33% crosslinking. The Example 2b laminate was foamed via a molten salt bath where the salt temperature was 446° F. at the entrance and exit of the bath. With a residence time of 63 seconds within the bath, the laminate expanded 1.42 times in the machine direction and 2.45 times in the cross-machine direction to obtain a foamed laminate of 2.83 mm thick with an overall density of 103 kg/m3 and 34% crosslinking. Images of the foamed laminate of Example 2a is shown in FIG. 3B and the foamed laminate of Example 2b is shown in FIG. 3C.

Example 3

Figure 4A:
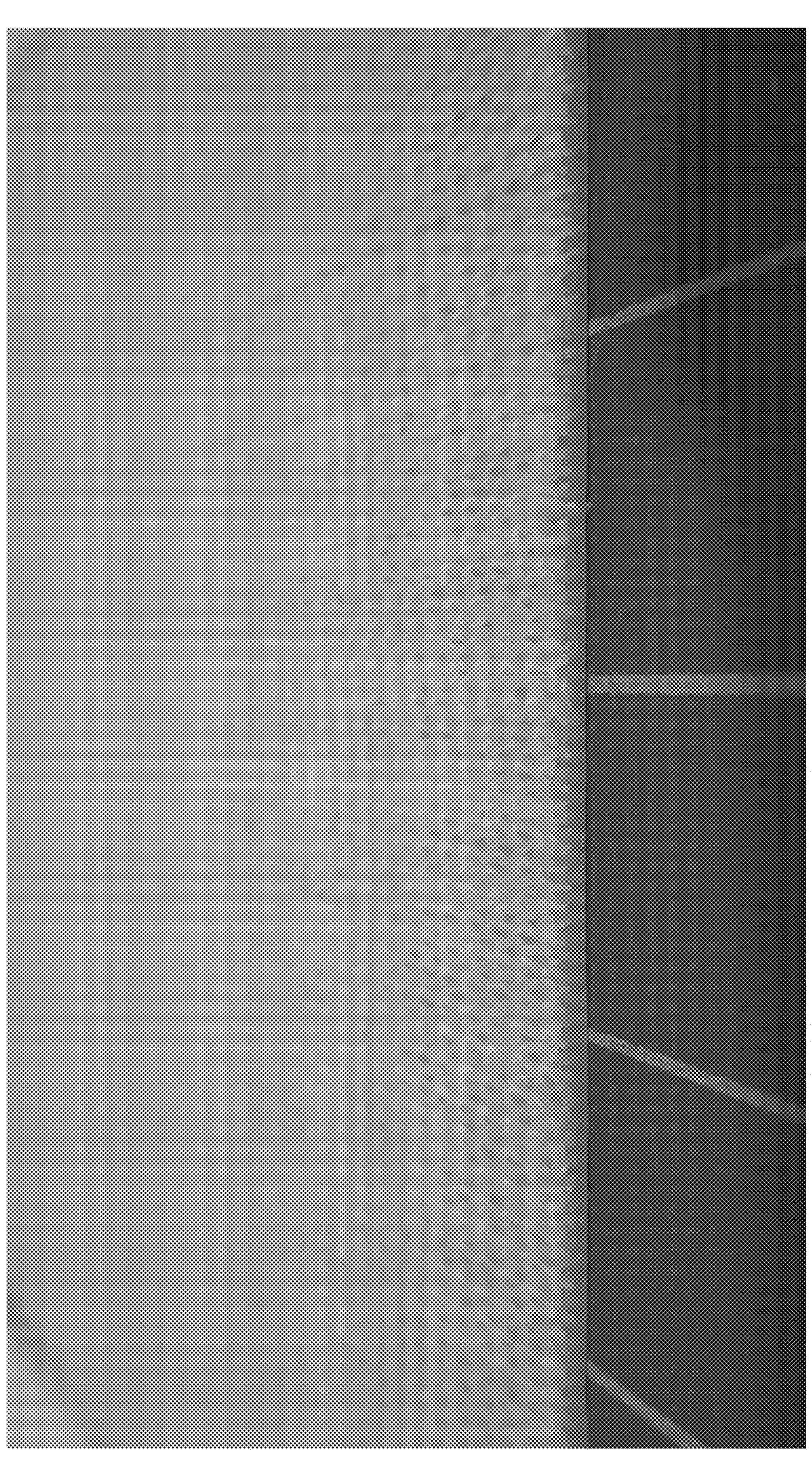
FIG. 4A illustrates an image of the unfoamed laminate used to produce Example 3 disclosed herein.
Figure 4B:
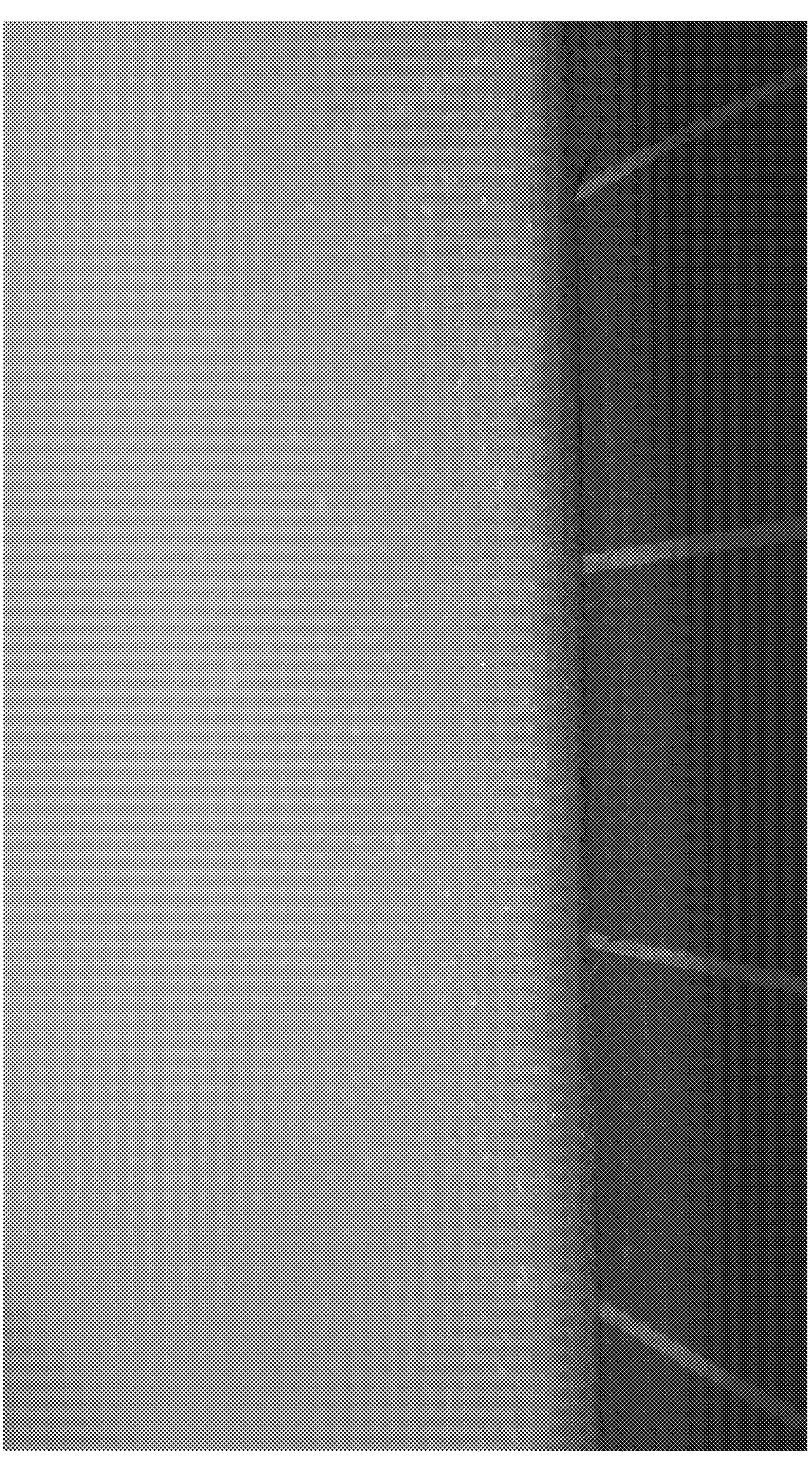
FIG. 4B illustrates an image of the foamed laminate of Example 3 disclosed herein.

A knitted textile was laminated to the foamable composition to obtain a laminate with a thickness of 1.34 mm. An image of the unfoamed laminate is shown in FIG. 4A. After 8 days the laminate was crosslinked via electron beam radiation with the textile side facing the electron beam source. The laminate was foamed via a hot air oven where the air temperature at the entrance to the oven was 463° F. and the air temperature at the exit of the oven was 477° F. With a residence time of 215 seconds in the oven, the laminate expanded 1.48 times in the machine direction and 2.72 times in the cross-machine direction to obtain a foamed laminate of 3.11 mm thick with an overall density of 103 kg/m3 and 30% crosslinking. An image of the foamed laminate is shown in FIG. 4B.

Example 4

Figure 5A:
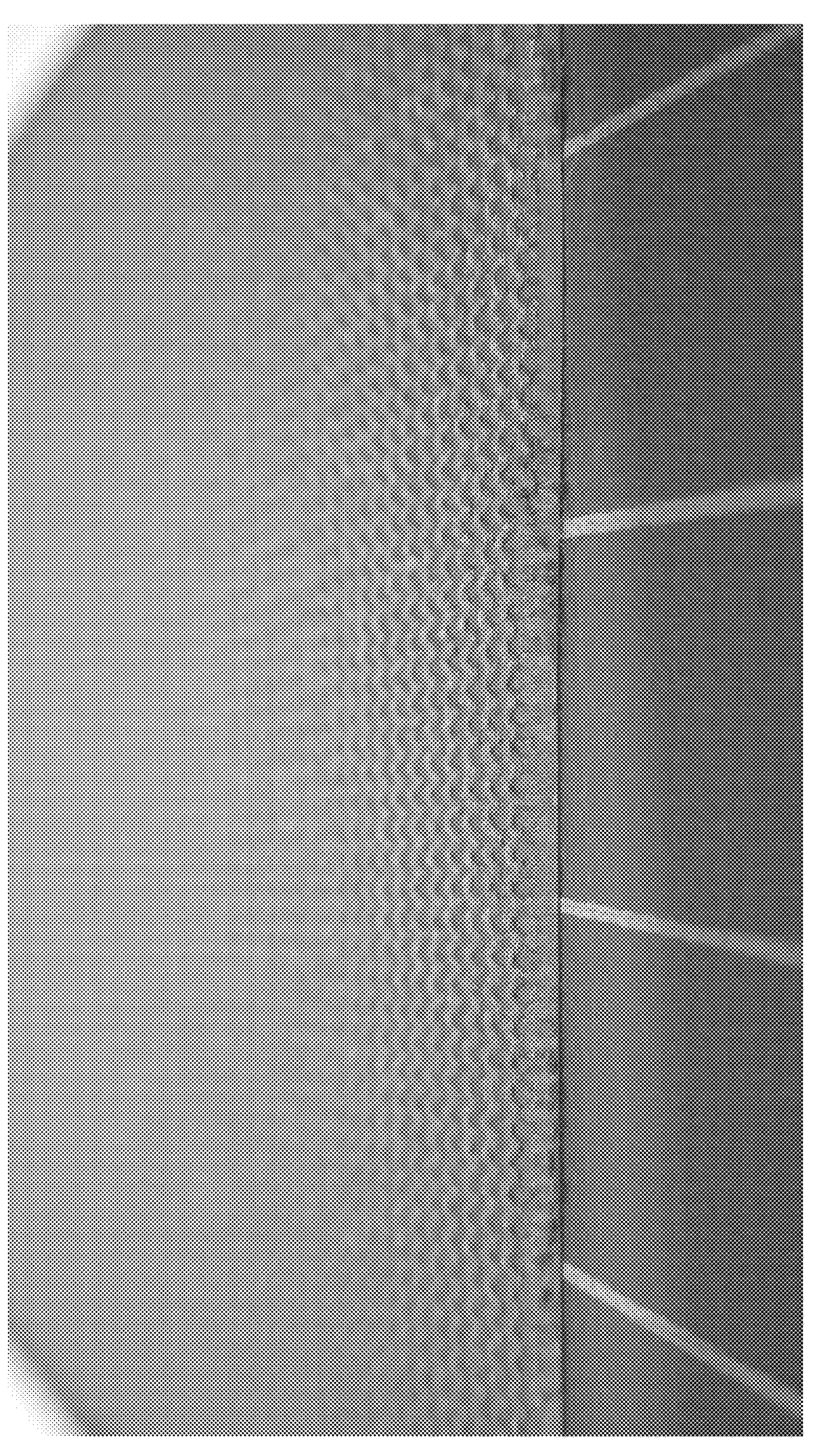
FIG. 5A illustrates an image of the unfoamed laminate used to produce Example 4 disclosed herein.
Figure 5B:
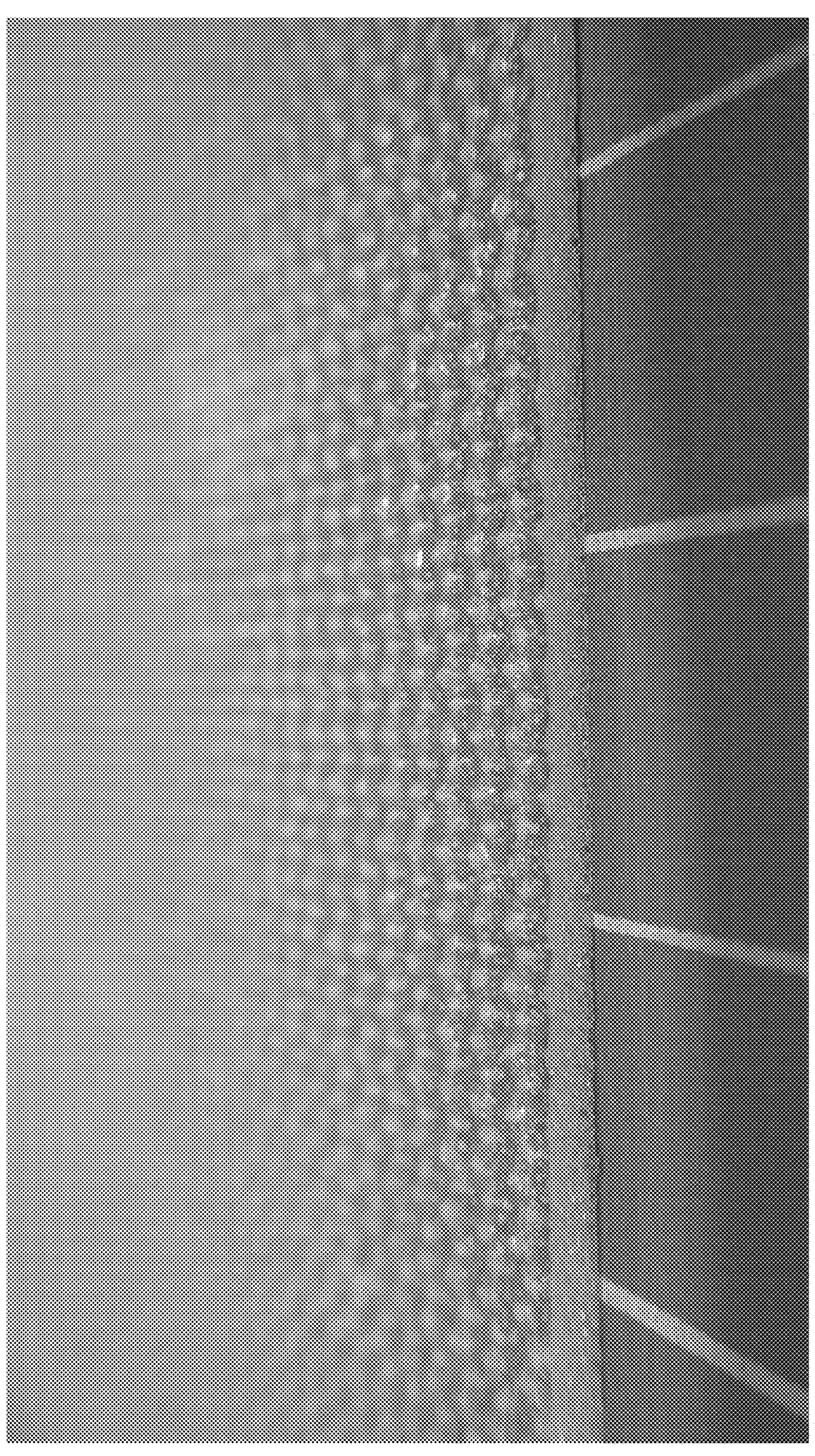
FIG. 5B illustrates an image of the foamed laminate of Example 4 disclosed herein.

A knitted textile was laminated to the foamable composition to obtain a laminate with a thickness of 1.26 mm. An image of the unfoamed laminate is shown in FIG. 5A. After 9 days the laminate was crosslinked via electron beam radiation with the foamable composition facing the electron beam source. The laminate was foamed via a hot air oven where the air temperature at the entrance to the oven was 465° F. and the air temperature at the exit of the oven was 474° F. With a residence time of 190 seconds in the oven, the laminate expanded 1.67 times in the machine direction and 2.16 times in the cross-machine direction to obtain a foamed laminate of 2.46 mm thick with an overall density of 131 kg/m3 and 35% crosslinking. An image of the foamed laminate is shown in FIG. 5B.

Example 5

Figure 6A:
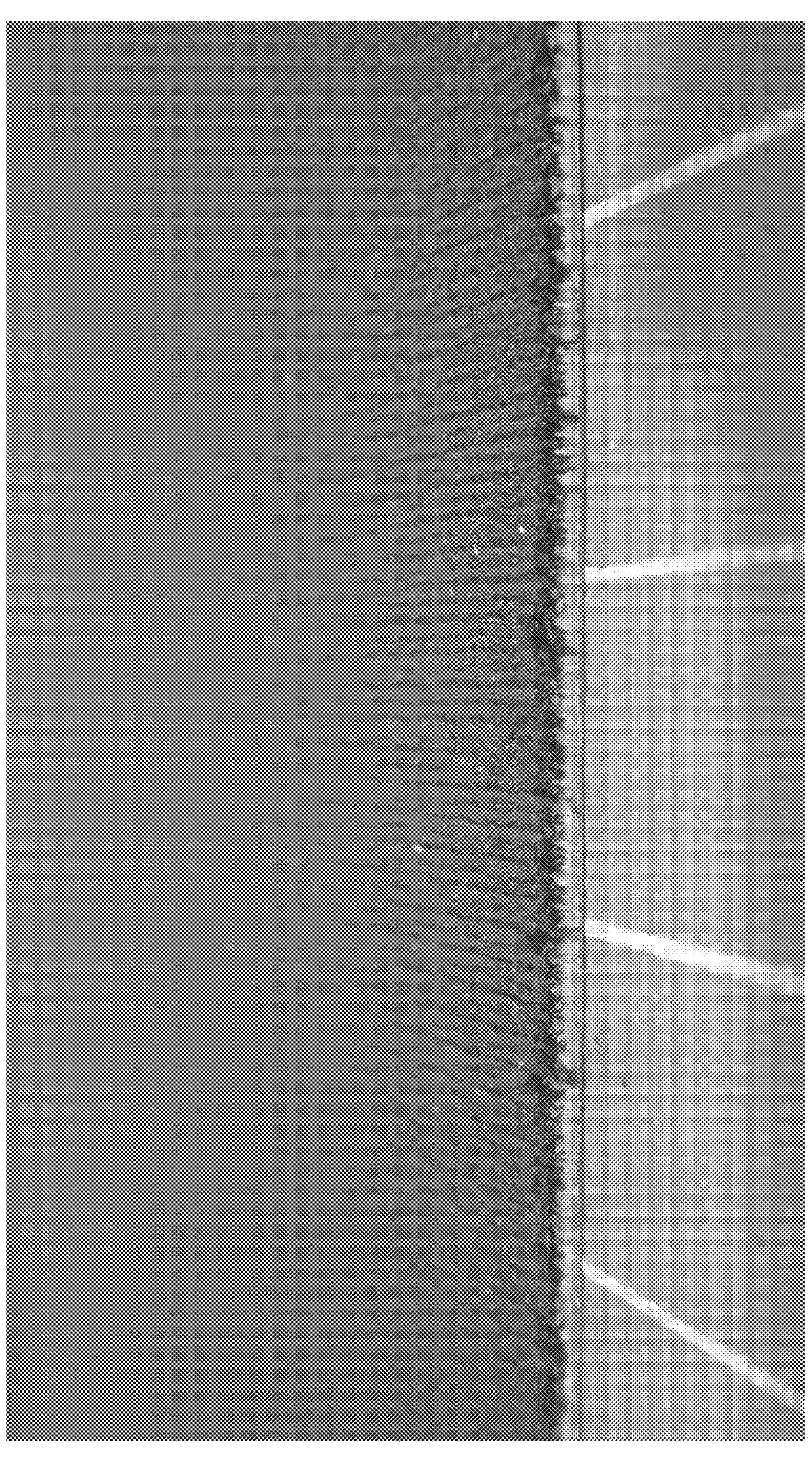
FIG. 6A illustrates an image of the unfoamed laminate used to produce Example 5 disclosed herein.
Figure 6B:
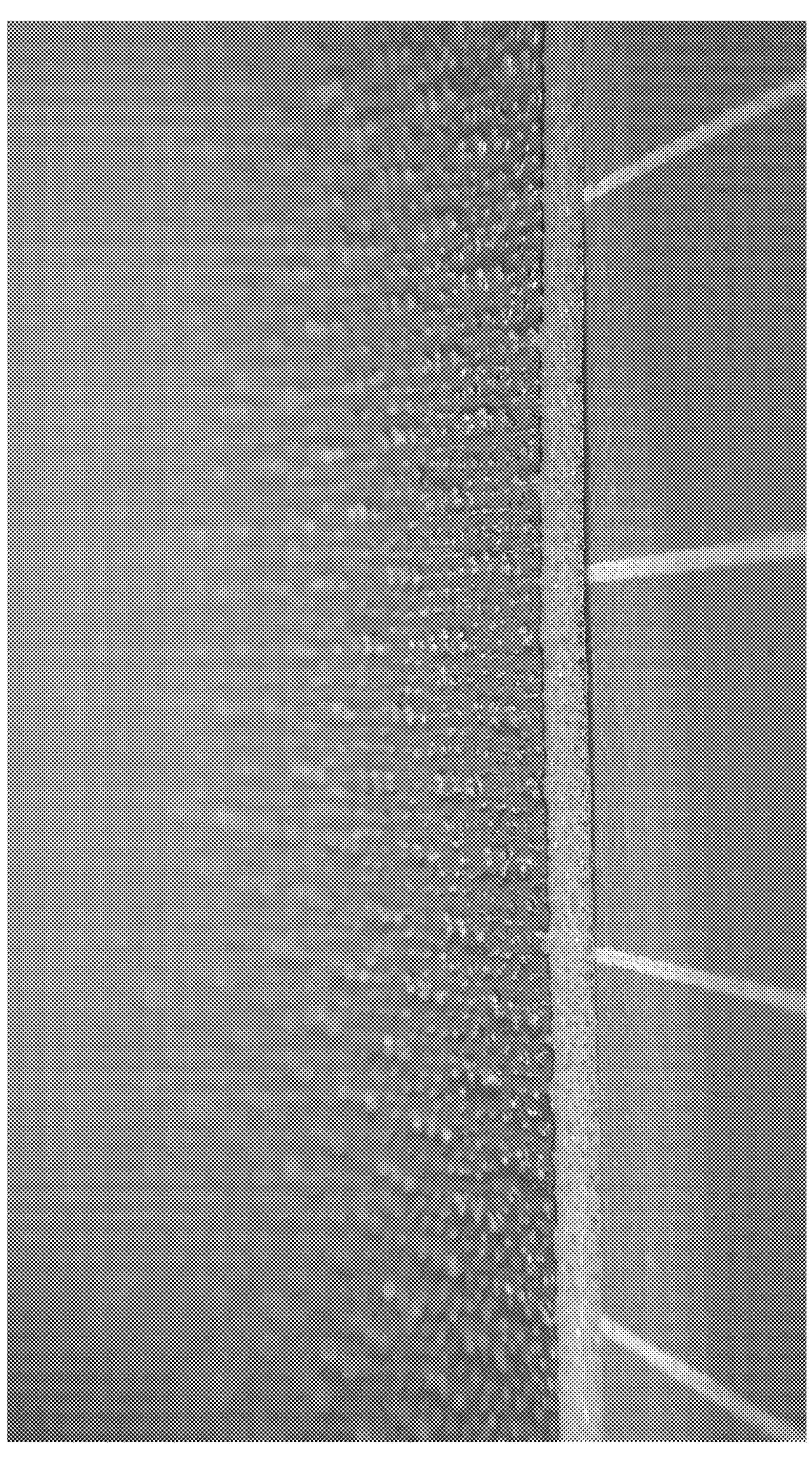
FIG. 6B illustrates an image of the foamed laminate of Example 5 disclosed herein.

A knitted textile was laminated to the foamable composition to obtain a laminate with a thickness of 1.33 mm. An image of the unfoamed laminate is shown in FIG. 6A. After 9 days the laminate was crosslinked via electron beam radiation with the foamable composition facing the electron beam source. The laminate was foamed via a hot air oven where the air temperature at the entrance to the oven was 457° F. and the air temperature at the exit of the oven was 467° F. With a residence time of 220 seconds in the oven, the laminate expanded 1.43 times in the machine direction and 1.72 times in the cross-machine direction to obtain a foamed laminate of 2.39 mm thick with an overall density of 168 kg/m3 and 35% crosslinking. An image of the foamed laminate is shown in FIG. 6B.

The following Tables 1 and 2 summarize the processing parameters and resultant foamed laminate, thickness, density, and gel:

TABLE 1

| Example # | Textile Type | Textile Composition | Foam Composition | Unfoamed Laminate Thickness | Elapsed Time From Extrusion to Irradiation | Irradiation Voltage | Irradiation Dosage | Side Facing Radiation Source |
|---|---|---|---|---|---|---|---|---|
| 1a | woven | PP-100% | PP + PE blend | 1.27 mm | 8 days | 640 kV | 45.0 kGy | textile |
| 1b | | | with | 1.27 mm | 8 days | 640 KV | 45.0 kGy | sheet |
| 2a | woven | PP-100% | crosslinking | 1.35 mm | 8 days | 640 KV | 45.0 kGy | sheet |
| 2b | | | promoter, ADCA and | 1.34 mm | 9 days | 650 KV | 46.8 kGy | sheet |
| 3 | knit | PP-100% | standard | 1.34 mm | 8 days | 640 kV | 45.0 kGy | textile |
| 4 | knit | PP-93% | polyolefin | 1.26 mm | 9 days | 650 KV | 46.8 kGy | sheet |
| 5 | knit | PP-100% | antioxidants | 1.33 mm | 9 days | 650 kV | $6.8 kGy | sheet |

TABLE 2

| Example # | Foaming Temperature | Type Foaming | Foaming Residence Time | MD Expansion | XMD Expansion | Foamed Laminate Thickness | Foamed Laminate Density | Foamed Laminate Gel |
|---|---|---|---|---|---|---|---|---|
| 1a | 467 -> 476° F. | hot air oven | 180 sec | 1.71 | 1.96 | 2.57 mm | 123 kg/m$^3$ | 39% |
| 1b | 446° F. | salt bath | 67 sec | 1.61 | 2.26 | 2.45 mm | 122 kg/m$^3$ | 41% |
| 2a | 463 -> 483° F. | hot air oven | 260 sec | 1.44 | 2.31 | 3.58 mm | 84.4 kg/m$^3$ | 33% |
| 2b | 446° F. | salt bath | 63 sec | 1.42 | 2.45 | 2.83 mm | 103 kg/m$^3$ | 34% |
| 3 | 463 -> 477° F. | hot air oven | 215 sec | 1.48 | 2.72 | 3.11 mm | 103 kg/m$^3$ | 30% |
| 4 | 465 -> 474° F. | hot air oven | 190 sec | 1.67 | 2.16 | 2.46 mm | 131 kg/m$^3$ | 35% |
| 5 | 457 -> 467° F. | hot air oven | 220 sec | 1.43 | 1.72 | 2.39 mm | 168 kg/m$^3$ | 35% |

The images/photographs of FIGS. 2A-6B were prepared by cutting the laminates in the cross-machine direction and then photographing the laminates at an angle of about 30 degrees above the textile side of each laminate.

This application discloses several numerical ranges in the text. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method of forming a laminate comprising:

extruding a foamable sheet comprising a crosslinking promoter and polypropylene and/or polyethylene;

feeding the extruded foamable sheet and a textile through a plurality of rollers to bond the textile to a side of the extruded foamable sheet to form a laminate;

irradiating the laminate with ionizing radiation, wherein irradiating the laminate with ionizing radiation occurs at least 5 days after forming the laminate such that at least some of the crosslinking promoter diffuses into the textile; and foaming the foamable sheet of the laminate.

2. The method of claim 1, wherein feeding the extruded foamable sheet and the textile through the plurality of rollers comprises applying pressure to a side of the extruded foamable sheet opposite the textile and applying pressure to a side of the textile opposite the extruded foamable sheet.

3. The method of claim 1, wherein the plurality of rollers is configured to melt bond the textile to the side of the extruded foamable sheet.

4. The method of claim 1, wherein the textile comprises at least polypropylene and/or at least polyethylene.

5. The method of claim 4, wherein the textile further comprises non-olefinic polymer, natural fiber, and/or animal-based fiber.

6. The method of claim 4, wherein the textile further comprises an antioxidant, lubricant, processing aid, thermal stabilizer, colorant, flame retardant, antistatic agent, electrostatic dissipative agent, nucleating agent, plasticizer, antimicrobial, fungicide, light stabilizer, ultraviolet (UV) absorbent, anti-blocking agent, filler, deodorizer, odor adsorber, anti-fogging agents, or combinations thereof.

7. The method of claim 4, wherein the textile has a non-olefinic content of at most 30 wt. %.

8. The method of claim 4, wherein the textile is a woven or a knit textile.

9. The method of claim 1, wherein the foamable sheet comprises a chemical foaming agent.

10. The method of claim 1, wherein the ionizing radiation is selected from the group consisting of alpha, beta (electron), x-ray, gamma, and neutron.

11. The method of claim 1, wherein the laminate is irradiated up to four separate times.

12. The method of claim 1, wherein the ionizing radiation crosslinks the laminate to a crosslinking degree of 15-75%.

13. The method of claim 1, wherein foaming comprises heating the irradiated laminate with molten salt and radiant heaters or a hot air oven.

14. The method of claim 1, further comprising applying tension to the textile in the machine direction while the textile is fed through the plurality of rollers.

15. The method of claim 1, further comprising applying tension to the textile in the cross-machine direction while the textile is fed through the plurality of rollers.

* * * * *